United States Patent
Tiffany, III

(10) Patent No.: US 6,256,873 B1
(45) Date of Patent: Jul. 10, 2001

(54) METHOD FOR MAKING SMART CARDS USING ISOTROPIC THERMOSET ADHESIVE MATERIALS

(75) Inventor: Harry J. Tiffany, III, Weldona, CO (US)

(73) Assignee: CardXX, Inc., Windsor, CO (US)

(*) Notice: Subject to any disclaimer, the term of this patent is extended or adjusted under 35 U.S.C. 154(b) by 0 days.

(21) Appl. No.: 09/267,244

(22) Filed: Mar. 12, 1999

Related U.S. Application Data

(60) Provisional application No. 60/078,262, filed on Mar. 17, 1998.

(51) Int. Cl.[7] .................................................. H01R 43/00
(52) U.S. Cl. .............................. 29/827; 29/825; 29/832; 174/52.2
(58) Field of Search .......................... 29/827, 832, 825; 174/52.2

(56) References Cited

U.S. PATENT DOCUMENTS

| | | |
|---|---|---|
| 4,339,407 | 7/1982 | Leighton . |
| 4,539,472 | 9/1985 | Poetker et al. . |
| 4,641,418 | 2/1987 | Meddles . |
| 4,961,893 | 10/1990 | Rose . |
| 5,134,773 | 8/1992 | LeMaire et al. . |
| 5,164,144 | 11/1992 | Rose . |
| 5,272,374 | 12/1993 | Kodai et al. . |
| 5,350,553 | 9/1994 | Glaser et al. . |
| 5,399,847 | 3/1995 | Droz . |
| 5,416,358 | 5/1995 | Ochi et al. . |
| 5,417,905 | 5/1995 | Lamaire et al. . |
| 5,423,705 | 6/1995 | Solomon, II . |
| 5,498,388 | 3/1996 | Kodai et al. . |
| 5,510,074 | 4/1996 | Rose . |
| 5,665,296 | 9/1997 | Jain et al. . |
| 5,689,137 | 11/1997 | Weber . |
| 5,894,006 | 4/1999 | Herbst . |
| 5,907,477 | 5/1999 | Tuttle et al. . |

FOREIGN PATENT DOCUMENTS

| | | |
|---|---|---|
| 0 350 179 | 1/1990 | (EP) . |
| 95400365 | 8/1995 | (EP) . |

*Primary Examiner*—Carl J. Arbes
(74) *Attorney, Agent, or Firm*—Dorr, Carson, Sloan & Birney, P.C.

(57) ABSTRACT

Smart cards employing ITA-based circuits can be made by associating a splitter edge material with the ITA-based circuit in order to direct an incoming stream of thermosetting polymeric above and below the ITA-based circuit.

25 Claims, 19 Drawing Sheets

AFTER COLD, LOW PRESSURE FORMING

BEFORE COLD, LOW PRESSURE FORMING

BEFORE COLD, LOW PRESSURE FORMING

AFTER COLD, LOW PRESSURE FORMING

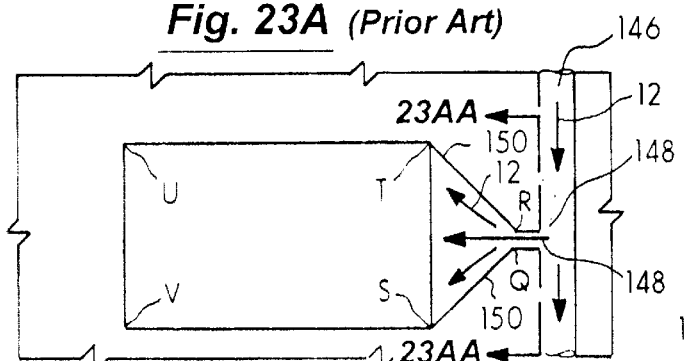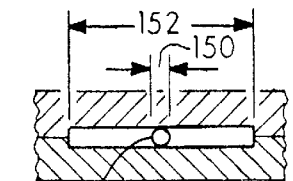
*Fig. 23A* (Prior Art)
*Fig. 23AA*
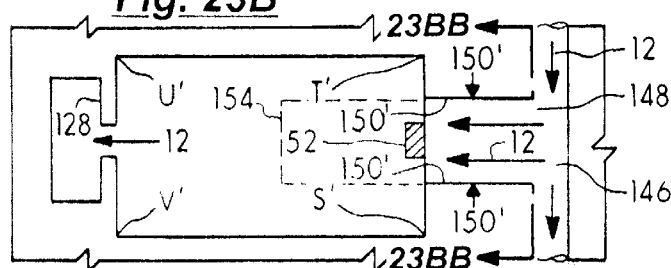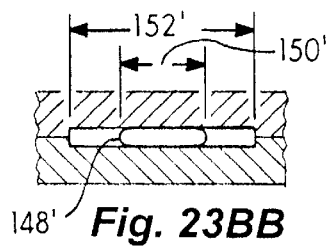
*Fig. 23B*
*Fig. 23BB*
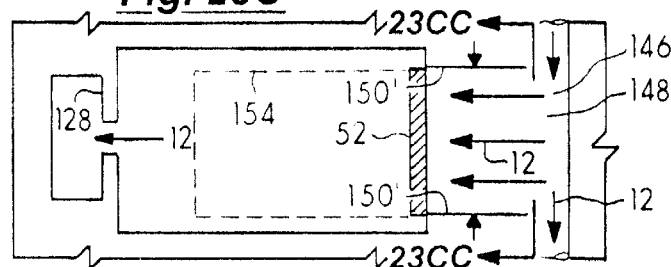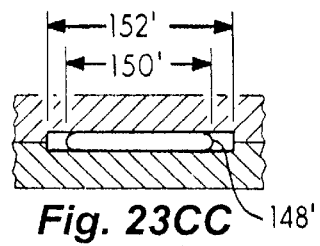
*Fig. 23C*
*Fig. 23CC*
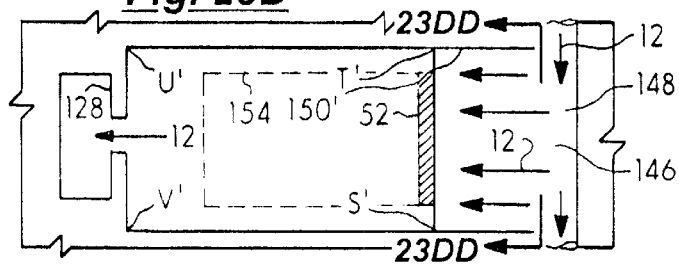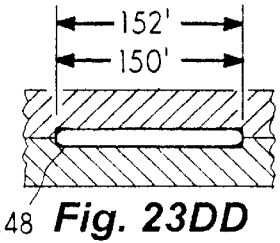
*Fig. 23D*
*Fig. 23DD*
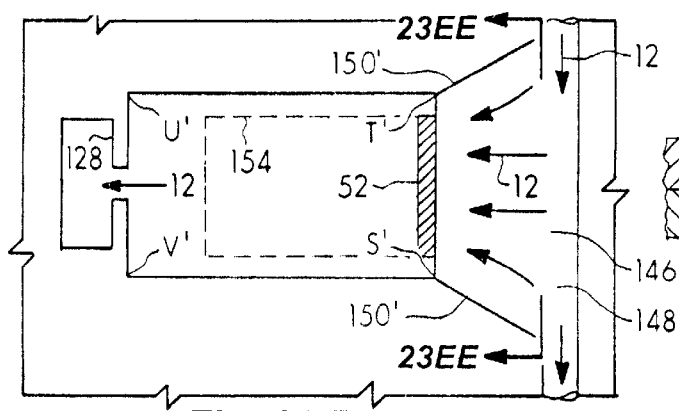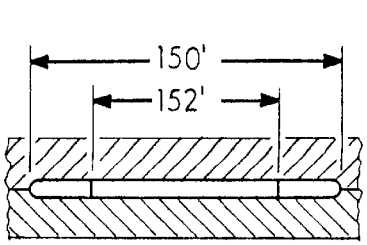
*Fig. 23E*
*Fig. 23EE*

METHOD FOR MAKING SMART CARDS USING ISOTROPIC THERMOSET ADHESIVE MATERIALS

RELATED PATENT APPLICATION

This patent application claims the benefit of, including the filing date of, Provisional Application Ser. No. 60/078,262 entitled "Provisional Patent Application re: Method for Making Smart Cards Using Isotropic Thermoset Adhesive Materials", filed Mar. 17, 1998.

BACKGROUND OF THE INVENTION

Smart cards are used as bankcards, ID cards, telephone cards and the like. They are based upon the use of an electromagnetic coupling (either by direct physical contact or by electromagnetic waves) between a smart card's electronic components and a card reader, pickup head, etc. of a receiving device such as an ATM machine. These electrical couplings may be used to effect a reading mode alone or a read/write mode.

Smart cards are usually made by assembling several layers of plastic sheets in a sandwich array. In the case of "contact" type smart cards, the card's contact surface is placed in direct physical contact with a machine's reader or pickup head component. In the case of so-called "contactless" smart cards (i.e., those smart cards whose electronic components are accessed by electromagnetic waves rather than by physical contact), a center layer of a polymerizable resin totally encapsulates an electronic module that may, for example, comprise an IC chip that is connected to an inductive coil type antenna that is capable of receiving electromagnetic waves through the body of the card.

The methods for making smart cards have varied considerably. For example, European Patent 0 350 179 discloses a smart card wherein electronic circuitry is encapsulated in a layer of plastic material that is introduced between the card's two surface layers. The method further comprises abutting a high tensile strength holding member against a side of a mould, locating the smart card's electronic components with respect to that side and then injecting a reaction moldable polymeric material into the mould such that it encapsulates the electronic components.

European Patent Application 95400365.3 teaches a method for making contactless smart cards. The method employs a rigid frame to position and fix an electronic module in a void space between an upper thermoplastic sheet and a lower thermoplastic sheet. After the frame is mechanically affixed to the lower thermoplastic sheet, the void space is filled with a polymerizable resin material.

U.S. Pat. No. 5,399,847 teaches a credit card that is comprised of three layers, namely, a first outer layer, a second outer layer and an intermediate layer. The intermediate layer is formed by injection of a thermoplastic binding material that encases the smart card's electronic elements (e.g., an IC chip and an antenna) in the intermediate layer material. The binding material is preferably made up of a blend of copolyamides or a glue having two or more chemically reactive components that harden upon contact with air. The outer layers of this smart card can be made up of various polymeric materials such as polyvinyl chloride or polyurethane.

U.S. Pat. No. 5,417,905 teaches a method for manufacturing plastic credit cards wherein a mold tool comprised of two shells is closed to define a cavity for producing such cards. A label or image support is placed in each mold shell. The mold shells are then brought together and a thermoplastic material injected into the mold to form the card. The inflowing plastic forces the labels or image supports against the respective mold faces.

U.S. Pat. No. 5,510,074 teaches a method of manufacturing smart cards having a card body with substantially parallel major sides, a support member with a graphic element on at least one side, and an electronic module comprising a contact array that is fixed to a chip. The manufacturing method generally comprises the steps of: (1) placing the support member in a mold that defines the volume and shape of the card; (2) holding said support member against a first main wall of the mold; (3) injecting a thermoplastic material into the volume defined by the hollow space in order to fill that portion of the volume that is not occupied by the support member; and (4) inserting an electronic module at an appropriate position in said thermoplastic material before the injected material has the opportunity to completely solidify.

U.S. Pat. No. 4,339,407 discloses an electronic circuit encapsulation device in the form of a carrier having walls which have a specific arrangement of lands, grooves and bosses in combination with specific orifices. The mold's wall sections hold a circuit assembly in a given alignment. The walls of the carrier are made of a slightly flexible material in order to facilitate insertion of the smart card's electronic circuitry. The carrier is insertable into an outer mold. This causes the carrier walls to move toward one another in order to hold the components securely in alignment during the injection of the thermoplastic material. The outside of the walls of the carrier have projections thereon which serve to mate with detents on the walls of the mold in order to locate and fix the carrier within the mold. The mold also has holes to permit the escape of trapped gases.

U.S. Pat. No. 5,350,553 teaches a method of producing a decorative pattern on, and placing an electronic circuit in, a plastic card in an injection molding machine. The method comprises the steps of: (a) introducing and positioning a film (e.g., a film bearing a decorative pattern), over an open mold cavity in the injection molding machine; (b) closing the mold cavity so that the film is fixed and clamped in position therein; (c) inserting an electronic circuit chip through an aperture in the mold into the mold cavity in order to position the chip in the cavity; (d) injecting a thermoplastic support composition into the mold cavity to form a unified card; and (e) thereafter, removing any excess material, opening the mold cavity and removing the card.

U.S. Pat. No. 4,961,893 teaches a smart card whose main feature is a support element that supports an integrated circuit chip. The support element is used for positioning the chip inside a mold cavity. The card body is formed by injecting a plastic material into the cavity so that the chip is entirely embedded in the plastic material. In some embodiments, the edge regions of the support are clamped between the load bearing surfaces of the respective molds. The support element may be a film which is peeled off the finished card or it may be a sheet which remains as an integral part of the card. If the support element is a peel-off film, then any graphics element(s) contained therein are transferred and remain visible on the card. If the support element remains as an integral part of the card, then such graphic(s) elements are formed on a face thereof and, hence, are visible to the card user.

U.S. Pat. No. 5,498,388 teaches a smart card device that includes a card board having a through opening. A semiconductor module is mounted onto this opening. A resin is injected into the opening so that a resin molding is formed under such condition that only an electrode terminal face for external connection of said semiconductor module is exposed. The card is completed by mounting a card board having a through opening onto a lower mold of two opposing molding dies, mounting a semiconductor module onto the opening of said card board, tightening an upper die that has a gate leading onto a lower die and injecting a resin into the opening via the gate.

U.S. Pat. No. 5,423,705 teaches a disc having a disc body made of a thermoplastic injection molded material and a laminate layer that is integrally joined to a disc body. The laminate layer includes an outer clear lamina and an inner white and opaque lamina. An imaging material is sandwiched between these lamina.

All of these prior art methods for making smart cards are to some degree concerned with properly positioning and fixing electronic components, modules or assemblies inside the smart card. If the electronic components are not properly affixed they will be moved to random positions when a thermoplastic material is injected into a card-forming, or card core-forming, cavity under the influence of rather high thermoset material injection pressures. The prior art noted above reveals use of various solid holding members such as frames or supports that are often used to position and fix the electronic elements during the thermoplastic injection processes. The use of relatively large, mechanical holding devices having hard, sharply defined, bodies to hold electronic components in place during injection of such thermosetting materials has, however, created certain problems. For example, the bodies of these relatively large holding devices (i.e., large relative to the electronic components they hold) are often adversely effected by those shock, flexure and/or torsion forces the card may encounter in normal (and abnormal) use. In order to minimize the damage caused by such forces, the electronic components held by some of these hard, sharply defined bodies are often positioned in a corner of such smart cards. This positioning limitation usually cuts down on the size and number of electronic components that can be placed in such cards.

Moreover, due to differences in the coefficient of expansion of the materials used to make these relatively large holding devices—relative to the coefficient of expansion of the other elements of such cards—deformations often appear on the external surfaces of finished cards that contain such electronic component holding devices. That is to say that surface deformations can result from the mere presence of such holding members in the body of the card as it experiences different temperatures and pressures during its manufacture. Such deformations are, at best, unsightly; at worst, they may even prevent the card from lying completely flat in the card-receiving receptacles in certain card reading machines.

Some smart card manufacturers have dealt with this problem by reducing the size and/or body of such holding devices by using various glues (rather than mechanical interconnecting locking devices) to securely position their holders (and hence the electronic component that they hold) in their card-forming cavities during the thermoplastic injection process. The use of such glues to secure these holder devices has, however, produced another set of problems. Such problems usually revolve around the fact that most commercially available, fast curing glues that are used to fix such electronic component holders in place also are often characterized by their high degrees of shrinkage. Moreover, relatively large volumes of glue are needed to fix these relatively large holders when they are impinged upon by the incoming thermoset material. Use of the relatively large volumes of high shrinkage glues needed to fix these holders in place tends to wrinkle and otherwise deform the region of a plastic sheet or layer to which such glues are applied. Worse yet, the forces created by these wrinkle-like deformations on the inside surfaces of the plastic sheets (e.g., sheets of polyvinyl chloride) used to make a smart card's surface layer(s) are transmitted through the relatively thin (e.g., from about 0.075 to about 0.25 mm) bodies of these sheet materials. These forces often cause the outer surface of the smart card to take on a local wave-like, bent, or even wrinkled, character. Beyond certain tolerances, these wave-like, bent, or wrinkle-like deformations are unacceptable to the smart card industry. Hence, many techniques have been developed to try to at least minimize deformities of this kind. Unfortunately, such deformations continue to be a problem—especially when smart cards are made using various high speed gluing methods to glue these relatively large holder devices to the thin sheets of the plastic materials (e.g., PVC) that form the outside surfaces of most smart cards.

In further response to the absence of a completely satisfactory solution to the above-noted problems, it has been proposed that both the large, rigid, circuitry holding devices, and the rigid, metal, electronics components (e.g., metal antenna loops, computer chips, capacitors, etc.) that they anchor in place, be replaced with a relatively thin, film-like layer of those polymeric, thermoset adhesive materials that also have the rather unusual ability to act as an electrical conductor. By using such a material, a smart card's circuitry can be made (e.g., by etching) an integral part of the conductive, film-like material. These polymeric, electricity-conducting materials are sometimes referred to as isotropic thermoset adhesive ("ITA") materials.

They were originally developed and used to bond electrical leads to computer chips and thereby eliminate the need for so-called, "gold bump" bonding of such elements. In other words these ITA materials were used to lower electronic component assembly costs by replacing gold as the electrically conductive bonding material used to connect a computer chip and an electrical lead.

These ITA materials were subsequently made into thin, film-like materials in which electrical circuitry was incorporated (e.g., by etching electrical circuitry into the ITA). These ITA film-like materials have been produced by Philips Electronics, the Netherlands. Aside from their lower space requirements in a smart card, and their lower costs, these ITA films are further characterized by the fact that they are much more flexible than the prior art metal circuitry that the ITA material has sought to replace. Hence, ITA circuits can withstand far greater flexure and/or torsional forces without breaking the electrical flow paths defined by their circuits.

Unfortunately, there is a very severe drawback associated with the use of these film-like materials for smart card circuitry. They lack "body" and mechanical "rigidity" and are, therefor, not well suited to some physical aspects of the manufacturing processes used to make smart cards. For example, these film-like materials usually do not have enough rigidity to be properly handled, and hence properly located in a void space formed by two sheets of thermosetting material that respectively form the top or face surface of the smart card and the bottom or obverse surface of that card. In the practice of the prior art, these ITA film-like materials are placed in this void space and held by the clamping action of the jaw, lip or edge surfaces of the front portions of the opposing molds used to make such cards. In effect, when this holding technique is employed, the front portion of the ITA film is gripped by the front of the mold device and the rear portion of ITA film simply "sags down" in the void space until it comes to rest on the top surface of the bottom layer of the smart card.

Thereafter, a hot, liquid thermosetting polymeric material is injected into the void space. In its sagged down position, the ITA film tends to become embedded in the lower portions of the thermosetting polymeric material that forms the core or center region of the card. For electrical signal transfer reasons, it is, however, highly preferred that the ITA material have a substantially level or horizontal orientation in the core of the card. When the above noted jaw-like clamping action is employed, the ITA film may also take on a "wave-like" configuration under the influence of the rush of incoming liquid, polymeric material. Indeed, the thin film-like ITA material is often torn from its front moorings (provided by the mold's jaw gripping action) by this rush of incoming liquid thermosetting polymeric material. Hence, in spite of all their potential advantages, ITA materials are not normally used as the circuit-defining component of smart cards.

SUMMARY OF THE INVENTION

Applicant's ITA circuit-containing smart cards (e.g., credit cards, personal identity cards, access control cards, telephone cards, etc.) are made possible by the use of certain, hereinafter more fully described, thermoplastic flow splitter devices. These devices are preferably physically associated (e.g., by gluing, thermobonding, etc.) with a sheet or film of isotropic thermoset adhesive (ITA) material that is to be used as a circuit component of these smart cards. The smart card may be a "contactless" type smart card, a "contact" type smart card or a hybrid contact/contactless smart card of the type sometimes referred to as "combi" smart cards. In any case, the splitter device divides or splits a stream of incoming thermosetting polymeric material into two streams. One stream generally flows over the sheet or film of ITA material and the other stream generally flows under the ITA material. This stream splitting action serves to position the ITA circuit component in a substantially horizontal orientation in, or near, the center of the core region of the smart card.

Applicant's procedures for orienting and positioning an ITA circuit component in, or near, the center of a core region of a smart card can be augmented and enhanced by the use of certain other specific materials and manufacturing methods that also are hereinafter more fully described. For example, applicant's ITA positioning methods may be further enhanced by use of (1) certain hereinafter more fully described "cold," "low pressure," forming procedures, (2) certain thermoset flow gate geometries and (3) certain receptacles in applicant's molds for receiving the thermosetting polymeric material that may be injected in excess of the amount needed to form the core regions of applicant's smart cards.

Applicant's smart cards are generally comprised of a top layer having an inside surface and an outside surface, a bottom layer having an inside surface and an outside surface and a center or core layer that is sandwiched between the top and bottom layers. The core or center layer also contains the ITA material. All three of these layers are unified into a smart card body by a bonding action between the thermosetting polymeric material used to create the core layer and the material(s) out of which the top and bottom layers are made. In some preferred embodiments of applicant's invention, this bonding action may be augmented through use of various hereinafter more fully described treatments of the inside surface of the top and/or bottom layers.

Thus, some, or all, of the electronic elements (e.g., computer chip, electrical circuitry, antenna, capacitor, etc.) that are contained in the ITA sheet or film are embedded in the thermosetting polymeric material that constitutes the card's center or core layer. If all of these electronic components are so embedded, they can communicate with a smart card-using machine such as an ATM by means of electromagnetic waves that are received into (and in some cases even transmitted out of) the body of the smart card via an antenna component of the card's electrical circuitry. In a particularly preferred embodiment of this invention, all of the smart card's electrical components are placed in a layer of ITA material that is completely embedded in the thermosetting polymer that comprises the core layer of the smart card. Again, such an arrangement produces a so-called "contactless" smart card. That is to say that, in this case, none of the ITA circuit components form any part of the external surface of the finished smart card.

In other cases, however, these ITA circuit components may be electrically connected to a reader or pickup head that does form a part of the surface of the smart card so that such reader comes into physical contact with a machine (e.g., an ATM) that employs the card. Again, cards having an exposed reader or pickup head are often referred to as "contact" type smart cards. Those skilled in this art also will appreciate that to be suitable for wide commercial use, all such smart cards must be made to very precise, standardized dimensions. For example, ISO Standard 7810 requires that contactless smart cards have a nominal length of 85.6 mm, a nominal width of 53.98 mm and a nominal thickness of 0.76 mm.

Before delving any further into the more precise details of applicant's methods for making the hereindescribed smart cards, it might be noted that for the purposes of this patent disclosure the terms "upper" and "lower," or "top" and "bottom," layer(s) should be regarded as being relative. That is to say that they are implied by the relative positions of the mold shells that are employed to manufacture these smart cards. Hence, these terms should not imply any absolute position or orientation.

Be this top/bottom nomenclature as it may, the hereindescribed methods for making smart cards will normally employ a reaction injection molding machine (which are often individually referred to as a "RIM"). Such a machine is mechanically associated with a top mold shell and a bottom mold shell that are capable of performing certain hereinafter more fully described molding operations (and especially certain cold, low pressure, molding operations) on at least one of the sheets of polymeric material (e.g., PVC) that make up the two major external surface layers of applicant's smart cards. Such top and bottom mold shells cooperate in ways that are well known to those skilled in the polymeric molding arts. For use in applicant's particular processes, however, at least one of the RIM's mold shells, e.g., the top mold shell, will have at least one cavity that at least partially defines the thickness of, and general peripheral extent of, a precursor smart card body that is to be pressure molded (e.g., cold, low pressure molded) between the two mold shells.

It might also be noted here that applicant's use of the term "precursor smart card body" (which will include bodies of "excess" polymeric material) is used to distinguish those roughly defined card bodies that are formed by such mold devices from those "finished" smart cards that are produced by removing the excess polymeric materials (e.g., by trimming them off of the precursor card body) and by cutting the precursor card bodies to certain prescribed sizes (e.g., to the 85.6 mm by 53.98 mm size prescribed by ISO Standard 7810) for any given finished product smart card. Such cutting to prescribed sizes also may remove the excess material in one cutting/trimming operation. Those skilled in this art also will appreciate that the molding devices used to make such cards in commercial production operations will most preferably, have mold shells having multiple cavities (e.g., 2, 4, 6, 8, etc.) for making several such cards simultaneously.

Those skilled in this art also will appreciate that applicant's use of terms like "polymeric," "plastic," "thermoplastic" and "thermosetting" each refer to a potentially wide variety of materials. Be that as it may, the polymeric materials employed by applicant will generally fall into one of two subcategories—thermoplastic materials or thermosetting materials. Thermoplastic materials consist of long molecules (either linear or branched) having side chains or groups that are not attached to other polymer molecules. Consequently, thermoplastic materials can be repeatedly softened and hardened by heating and cooling so they can be formed, and then cooled so that they harden into a final desired shape. Generally speaking, no appreciable chemical changes take place during such heat driven, forming operations. Conversely, thermosetting materials (such as their resins), have chemically reactive portions that form chemical cross-linkages between their long molecules during their polymerization. These linear polymer chains become bonded together in stereo chemical structures. Therefore, once such thermosetting resins are hardened, the resulting material cannot be softened by heating without permanently degrading at least some of these chemical cross linkages.

Either form of polymeric material (thermoplastic or thermosetting) may be used for the top layer and/or the bottom layer of applicant's smart cards. Hence, applicant's use of the general term "polymeric" with respect to the materials out of which applicant's top and bottom layers can be made should be taken to include thermosetting materials as well as thermoplastic materials. Thermosetting polymers are, however, highly preferred for creating the center or core layer of applicant's smart cards. There are several reasons for this reference. For example, thermoset polymers generally bond with those materials (e.g., PVC) from which the top and bottom layers are preferably made. Thermoset polymers also can be commercially obtained in easy to use, liquid monomer-polymer mixtures, or partially polymerized molding compounds, that are particularly well suited for use in applicant's more preferred cold, low pressure forming operations.

Some representative polymeric materials (thermoplastic or thermosetting) that can be used for making applicant's top and bottom layers will include polyvinyl chloride, polyvinyl dichloride, polyvinyl acetate, polyethylene, polyethyleneterephthalate, polyurethane, acrylonitrile butadiene styrene, vinyl acetate copolymer, polyesters, polyethylene, epoxy and silicones. Such top and bottom layers also may be made from other polymeric materials such as polycarbonate, cellulose acetate and cellulose acetate butyrate-containing materials. Of all the polymeric materials from which applicant's top and bottom layers could be made, however, polyvinyl chloride ("PVC") is especially preferred because of the clear to opaque visual qualities of this material, its ability to bond with various thermosetting materials, its ability to receive printing and its relatively lower cost.

The most preferred thermosetting materials for applicant's injection purposes are polyurethane, epoxy and unsaturated polyester polymeric materials. By way of some more specific examples, polyurethanes made by condensation reactions of isocyanate and a polyol derived from propylene oxide or trichlorobutylene oxide are especially preferred. Of the various polyesters that can be used in applicant's processes, those that can be further characterized as being "ethylenic unsaturated" are particularly preferred because of their ability to be cross linked through their double bonds with compatible monomers (also containing ethylene unsaturation) and with the materials out of which applicant's top and bottom layers are made (e.g., PVC). The more preferred epoxy materials for use in the practice of this invention will be those made from epichlorohydrin and bisphenol A, or epichlorohydrin, and an aliphatic polyol (such as glycerol). They are particularly preferred because of their ability to bond with some of the more preferred materials (e.g., PVC) out of which applicant's top and bottom layers are made. These three general kinds of thermosetting material, (polyurethane, epoxy and unsaturated polyester), also are preferred because they do not tend to chemically react with applicant's more preferred glues (e.g., various cyanoacrylate-based glues), to form unsightly "artifacts" in the core regions of applicant's card bodies.

Next, it should be noted that applicant's use of expressions such as "cold, low pressure forming conditions" generally should be taken to mean forming conditions wherein the temperature of the injected polymeric liquid or semi-liquid material is less than the heat distortion temperature of the plastic sheet material being cold formed (e.g., the top layer of applicant's smart cards), and pressures less than about 500 psi. In some of the more preferred embodiments of the hereindescribed processes, the cold forming temperatures used in applicant's processes will be at least 100° F. less than the heat distortion temperature of the plastic sheet material being molded. By way of a more specific example, the heat distortion temperature of many polyvinyl chloride (PVC) materials is about 230° F. Hence, the temperatures used to cold form such PVC sheets in applicant's process preferably will be no more than about (230° F.–100° F.) 130° F.

Applicant's more preferred cold, low pressure forming procedures will involve injection of thermosetting polymeric materials whose temperatures range from about 56° F. to about 160° F., under pressures that preferably range from about atmospheric pressure to about 500 psi. More preferably, the temperatures of the thermosetting polymers being injected into the center or core region of applicant's cards will be between about 65° F. and about 70° F. under injection pressures that preferably range from about 80 to 120 psi. In some of the most preferred embodiments of this invention the liquid or semi-liquid thermosetting polymeric material will be injected into any given card forming cavity under these preferred temperature and pressure conditions at flow rates ranging from about 0.1 to about 50 grams/second/card-forming cavity. Flow rates of 1.5 to 1.7 grams/seconds/card-forming cavity are even more preferred. These relatively low temperature, pressure and flow rate conditions tend to prevent thermal and/or mechanical damage to the relatively delicate ITA materials used in applicant's mart cards. Those skilled in this art also will appreciate applicant's, more preferred, low temperature and pressure conditions contrast rather sharply with the much higher temperatures (e.g., 200° F. to 1000° F.) and pressures (e.g., from 500 to 20,000 psi) used in many prior art, high speed, smart card lamination or injection molding manufacturing operations.

Next, it should be noted that applicant's use of such relatively cold, low pressure, forming conditions may require that any given gate (i.e., the passageway that connects a runner with each individual card-forming cavity) be larger than those gates used in prior art, hot, high pressure operations. Applicant's gates are, preferably, relatively larger than prior art gates so that they are able to quickly pass the thermoset material being injected under applicant's cold, low pressure forming conditions. The gate region is also a preferred location for the splitter component of the applicant's ITA film or layer or sheet material.

The runner (i.e., the main thermoset material supply passageway in the mold system that feeds from the source of the thermoset material to each individual gate), will normally be in a multi-gate or manifold array, and, hence, should be capable of simultaneously supplying the number of gates/card forming cavities (e.g., 4 to 8 cavities) in the manifold system at the relatively cold temperature (e.g., 56° F. to 160° F.) and relatively low pressure (e.g., atmospheric pressure to 500 psi) conditions used in applicant's process. It also might be noted at this point that the flow rates for the polymeric thermoset material under applicant's low temperature and pressure conditions nonetheless, should be such that they are able to completely fill a given card-forming cavity in less than about 10 seconds per card-forming cavity (and more preferably in less than about 3 seconds). Card-forming cavity fill times of less than 1 second are even more preferred. In view of these conditions, certain preferred embodiments of applicant's smart card making processes will employ gates having a width which is a major fraction of the length of a leading edge of the card to be formed (that is, a card edge which is connected to a gate). Applicant prefers that the width of a given gate be from about 20 percent to about 200 percent of the width of the leading edge (or edges—multiple gates can be used to fill the same card—forming cavity), i.e., the "gated" edge(s), of the smart card being formed.

Some applications of this invention may call for the use of gates that are tapered down from a relatively wide inflow area to a relatively narrow core region that ends at or near the leading edge(s) of the card body being formed. For example, these gates may narrow down from a relatively wide diameter (e.g., from about 5 to about 10 mm) injection port that is in fluid connection with the thermosetting material-supplying runner, to a relatively thin diameter (e.g., 0.10 mm) gate/card edge where the gate feeds the thermosetting material into the void space which ultimately becomes the center or core of applicant's finished card. By way of further example, applicant has found that gates that taper from an initial diameter of about 7.0 millimeters down to a minimum diameter of about 0.13 mm will produce especially good results under applicant's preferred cold, low pressure injection conditions.

Another optional feature that can be used to advantage in making applicant's ITA-containing smart cards is the use of mold shells that have one or more receptacles for receiving "excess" polymeric material that may be purposely injected into the void space between applicant's top and bottom layers in order to expunge any air and/or other gases (e.g., those gases formed by the exothermic chemical reactions that occur when the ingredients used to formulate most polymeric thermoset materials are mixed together) from said void space. These thermoset ingredients are preferably mixed just prior to (e.g., about 30 seconds prior to) their injection into the void space.

Still other optional procedures that may be used to enhance the results of using ITA-based circuits in the hereindescribed smart cards may include the use of: (1) treatments that encourage and/or augment the bonding action between the inside surfaces of the top and bottom layers and the injected thermosetting material, (2) surface layers that display alphanumeric/graphic information that is visible at the card's major surface(s), (3) opacity promoting (or preventing) films or layers, (4) use of top layers or bottom layers that are at least partially pre-molded by a preceding molding operation (e.g., a preceding, prior art type, "hot" molding operation or a preceding "cold" molding operation such as those described in this patent disclosure and/or (5) the use of opacity promoting pigment(s) in the thermoset material. It might also be noted here that the outside surfaces of the smart cards resulting from applicant's manufacturing processes may be thereafter embossed or printed upon in order to display alphanumeric/graphic/photographic etc. information.

Aside from their use of properly oriented and positioned ITA circuit components), the smart cards resulting any and all of these operations are particularly characterized by their high quality external surfaces. The term "high quality" in the context of this patent disclosure should be taken to imply a substantially flat surface (i.e., a surface having no waves, bends, wrinkles or pock marks).

Applicant's methods for making the smart cards of this patent disclosure also may, as further optional feature(s), involve the use of at least one gas venting procedure and/or at least one excess polymeric material receiving receptacle. More preferably, there will be at least one such receptacle per card-forming cavity. The presence of such gas venting and/or excess material receiving receptacles will allow gases (e.g., air, and the gaseous reaction products associated with those usually exothermic chemical reactions of the polymeric material forming ingredients) and/or relatively small amounts of the incoming thermoset polymeric material itself to escape from each void space during applicant's cold, low pressure forming operations and be received in such receptacles and/or be totally flushed out of the mold system. These gas venting procedures and excess material receptacles generally serve to prevent imperfections that may otherwise be created by entrapping gases in the void space during the injection of the polymeric material.

Thus, a highly preferred embodiment of applicant's invention involves injecting a flowable liquid or semi-liquid moldable polymeric material into a void space between the top and bottom layers of applicant's smart card that is not otherwise occupied by the ITA material, in a process wherein; the top and bottom molds are respectively abutted against the top and bottom layers of the smart card at a mold parting line perimeter or lip region at pressures that are sufficient to (a) clamp a ITA material in position in the void space, (b) completely fill the void space with a liquid or semi-liquid thermosetting polymeric material under the forming conditions (an preferably the cold forming conditions) used in the hereindescribed processes, (c) drive minor amounts of the polymeric material out of the card forming cavities and into the excess material receptacle and/or (d) drive the gases in the void space to the excess material receptacle and/or drive such gases completely out of the mold system (e.g., drive such gases out of the mold at the parting line regions where the top and bottom mold shells come together). Thus, the mold lip pressures used in applicant's procedures should be sufficient to hold the ITA material (and especially a splitter device associated with said ITA material) in place as well as hold the pressures at which the thermoplastic material is injected in order to completely fill the void space between the top and bottom (e.g., between about ambient pressure and 200 psi)—but still permit small amounts of the thermoset material and any gases to be flushed or squirted out of the mold system at its parting line. In other words, in these preferred embodiments, applicant's "excess" material receptacles need not, and preferably will not, receive all of the excess material injected into the void space. Excess thermoset material and/or gases also may be—and preferably are—expunged from the entire mold system at the parting line where the top mold lip and the bottom mold lip abut against each other at a parting line. In effect, the incoming liquid or semi-liquid thermoset polymeric material completely fills the void space, immerses the ITA and any other electronic components positioned in the core region of the smart card and forces any air present in the void space between the top and bottom layers (as well as any gases created by the chemical reaction of the starting ingredients of the polymeric material) out of the void space. In some preferred cases the air (and reaction gases) are completely driven out of the mold system. All such actions serve to eliminate any card surface imperfections such as surface "pock marks" and/or encapsulated bubbles that might otherwise form if such gases were entrapped in the thermoset polymeric material when it solidifies to form the core region of applicant's cards.

Finally, it also should be noted that the top and/or bottom layers used in applicant's processes may be at least partially molded into cavity-containing forms before they are placed in the mold system used to make the smart cards of this patent disclosure. Hence, the "cold, low pressure" molding operations called for in this patent disclosure may be only a part of the total molding to which these layer or sheet materials are subjected. Thus, for example the cold, low pressure molding procedures of this patent disclosure may provide only a partial amount of the total molding experienced by a molded top layer of applicant's smart card. In the more preferred embodiments of this invention, however, the top layer will experience a major portion, e.g., at least 50 percent, and more preferably all of the total molding it experiences (as defined by the change in the volume of the cavity created by the molding operation) by the cold, low pressure molding operations of this patent disclosure.

Thus, a particularly preferred embodiment of applicant's process for making a smart card having a top layer, a core layer (in which an ITA material is embedded) and a bottom layer, will comprise (1) placing a film, sheet, layer, etc. of a ITA material—that is further provided with a sheet-like body that forms a splitter edge between the top layer and bottom layer—in a position such that a runner that feeds the smart card-forming cavity in a molding device leads to the splitter edge that is associated with the ITA material; (2) positioning the ITA material and a bottom layer in a bottom mold; (3) positioning a top layer in a top mold; (4) closing the top mold to the bottom mold in a manner which grips the splitter edge associated with the ITA material and which creates a void space between the top layer and bottom layer; (5) injecting a thermosetting polymeric material into the void space at a temperature and pressure which are such that: (a) a film, sheet, layer, etc. of the ITA material is at least partially oriented and positioned by the flow of the thermosetting polymeric material over and under the leading edge of the splitter, (b) at least one layer of the smart card is at least partially cold, low pressure molded into a cavity in the mold device, (c) gases and excess polymeric material are driven out of the void space, (d) the film, sheet, layer, etc. of the ITA material is embedded in the thermosetting polymeric material in a substantially horizontal orientation and (e) the thermosetting polymeric material bonds with both the top layer and the bottom layer to produce a unified precursor smart card body; (6) removing the unified precursor smart card body from the mold device; and (7) trimming the precursor smart card to a desired dimension to produce a smart card. Other optional procedures described in this patent disclosure may be used to further augment and enhance this preferred process in order to produce smart cards having still higher quality characteristics.

BRIEF DESCRIPTION OF THE DRAWINGS

FIG. 7A shows an embodiment of this invention wherein portions of the "jaws" of an upper mold and a lower mold are shown gripping the top surface and the bottom surface of the splitter edge material.

FIGS. 23A through 23E depicts cut-away plan and cross section views of various comparative gates for injection of applicant's thermoset materials.

DETAILED DESCRIPTION OF THE INVENTION

Figure 1:
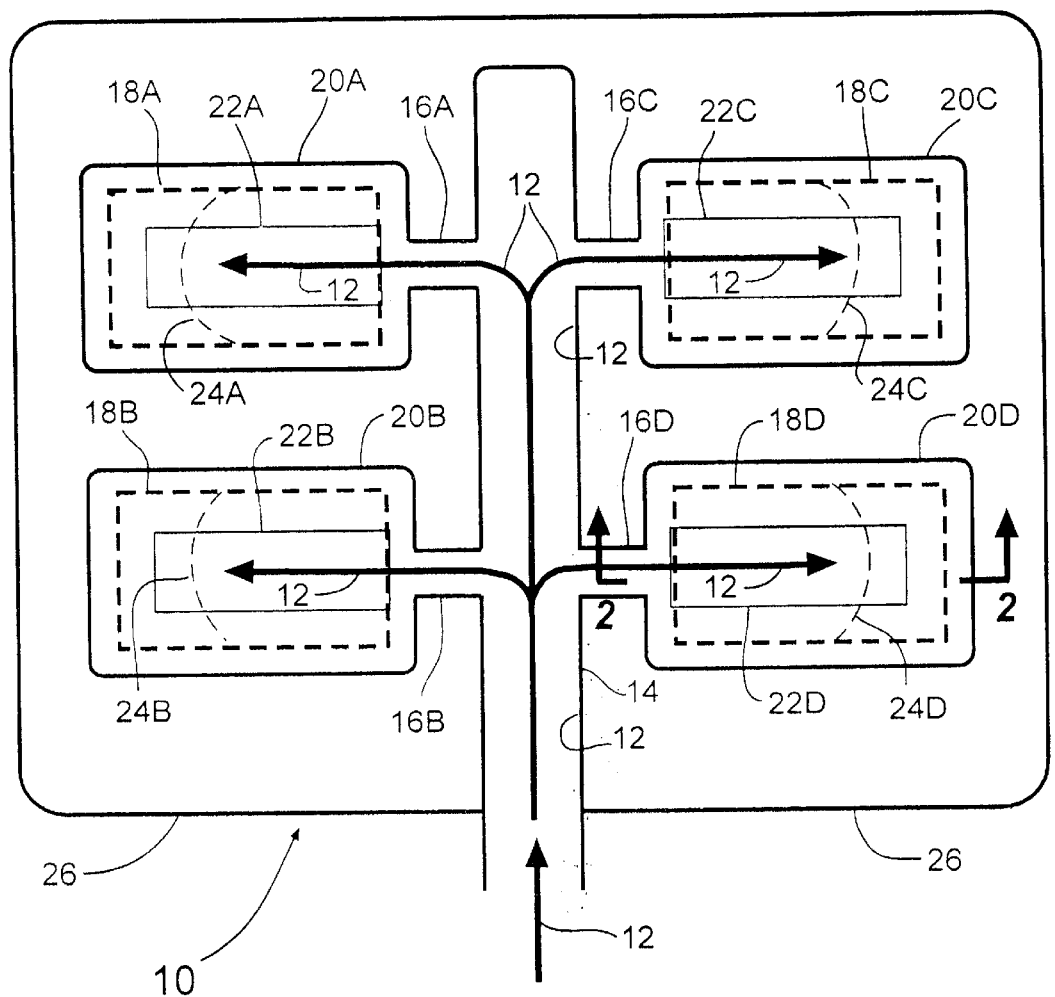
FIG. 1 is a cut-away plan view of a mold system for making prior art smart cards that may employ ITA materials.

FIG. 1 depicts a plan view of a prior art mold system 10 for making four smart cards simultaneously. A stream of liquid or semi-liquid thermosetting polymeric material 12 is shown being injected into a central runner conduit 14 that, in manifold fashion, leads into gates 16A, 16B, 16C and 16D, of mold cavities 18A, 18B, 18C and 18D in their respective molds 20A, 20B, 20C and 20D. A strip or film of ITA material 22A, 22B, 22C and 22D Is shown respectively in each mold. These ITA strips provide the electric circuitry for such smart cards. Phantom lines 24A, 24B, 24C and 24D depict the leading edge of an incoming body of the liquid thermosetting polymeric material 12. The edge of the mold system 10 is generally depicted by line 26.

Figure 2:
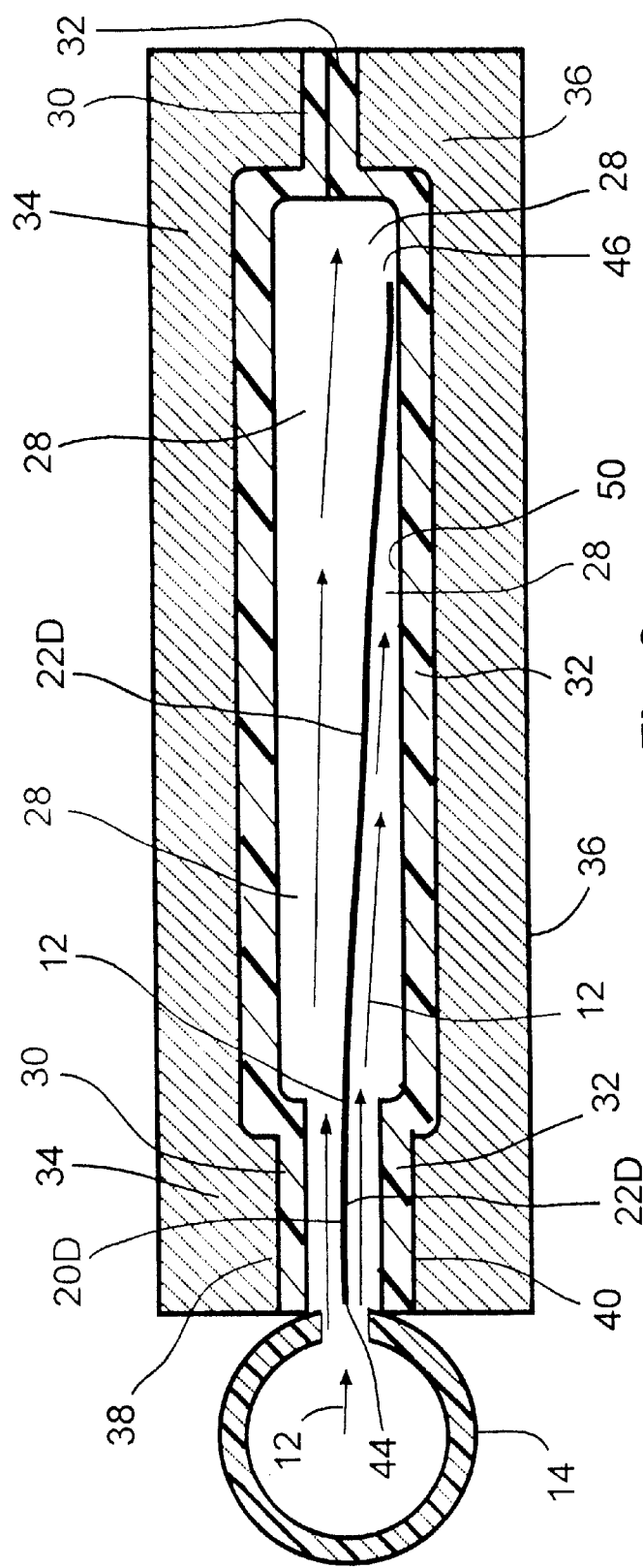
FIG. 2 is a cut-away, side view of a prior art mold system in which a film of ITA material resides.

FIG. 2 is a cut-away, side-view of one of a mold system 18D of the general mold system 10 shown in FIG. 1. In such a system the central runner conduit 14 delivers the thermoset material 12 into a void space 28 between the top layer 30 and bottom layer 32 of the card. As seen in FIG. 2, the mold system 10 has a top mold half shell 34 and a bottom mold half shell 36. The top mold half shell 34 is shown in top layer-molding-contact with the top layer 30 of polymeric material that will eventually form the top layer of the resulting smart card. Similarly, the bottom mold half shell 36 is shown in contact with a bottom layer 32 of polymeric material that will form the bottom layer of the smart card. The top mold half shell 34 is shown provided with a lip or jaw region 38 that, in cooperation with a counterpart lip or jaw region 40 of the bottom mold half shell 36 serve to define an opening between the top layer 30 and the bottom layer 32 into which the thermosetting material 12 is injected into the void space 28. An extended side of the opposing jaw regions 38 and 40 also clamps the front or left end 44 of a sheet, layer or film of ITA material 22D. The sheet, layer or film of the ITA material 22D is shown extending into the cavity or void space 28 that will define the core region of a finished smart card. In effect, a strip or film of ITA material 22D will be contained in the core region or void space 28. The right end 46 of the sheet, layer or film of the ITA material 22D is shown "sagging down" and coming to rest at a point generally depicted by arrow 48 on the top surface 50 of the bottom layer 32.

FIG. 2 also illustrates a very likely final position of the ITA film material 22D in a dried body of the thermosetting polymeric material 12 injected into the core region of a finished card in those cases where applicant's hereinafter more fully described splitter edge material is not employed to split an incoming liquid stream of said polymeric material 12. Again, this stream splitting takes place when the leading edge 44 of an ITA film is presented to an incoming stream of the thermosetting polymeric material 12. In other words, if applicant's stream splitting edge device 52 is not used, an ITA film 22D such as that depicted in FIG. 2, tends to stay in the same "sagged" position it was in before the thermosetting polymeric material 12 was injected to form the core region of the smart card.

This "sagged" position or state of the ITA material 22D is undesirable for at least two reasons. First, the ITA material 22D is in direct contact (e.g., at point 48) with the top surface 50 of the bottom layer 36 of the smart card. This makes the ITA film 22D more susceptible to damage by bending or torsional forces on the external surfaces of the smart card. Second, the ITA film 22D makes better electromagnetic wave signal communication with a smart card reader device (e.g., an ATM) when the circuit contained in the ITA material 22D is substantially parallel to a pickup head of the card reader device (not shown). This parallel arrangement is most easily achieved when the ITA film 22D is in the substantially horizontal orientation depicted in FIG. 5 rather than in the "sagged down" orientation depicted in FIG. 2. Thus, "success" in the practice of this invention would be the condition wherein the ITA material 22D is not in contact with the bottom layer 34 of the card. An added degree of success is achieved if the ITA material 22D also is in a substantially flat configuration and in a substantially horizontal orientation in the core region of the end product smart card.

Figure 3:
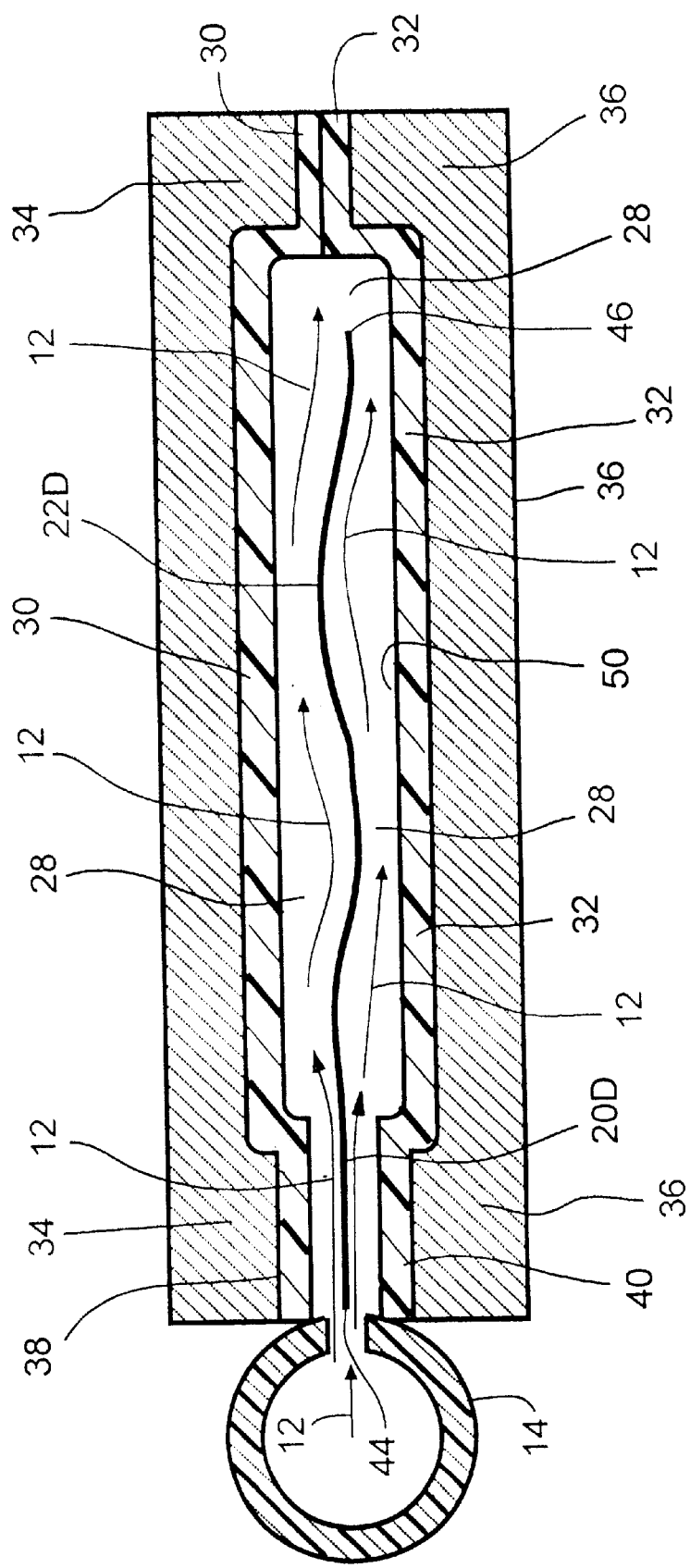
FIG. 3 is a cut-away, side view of a mold system in which a thermosetting polymeric material is being injected in a manner that creates a wave-like configuration in a film of the ITA material.

FIG. 3 is a cut-away, cross-section view of a prior art smart card-forming mold set up. It shows a core or void region 28 formed between a top layer 30 of polymeric material such as PVC and a bottom layer 32 of a comparable material (e.g., PVC). A stream of thermosetting material 12 is shown being injected into the void space 28 and thereby creating an "undesired" wave-like configuration in a film of ITA material 22D.

Figure 4:
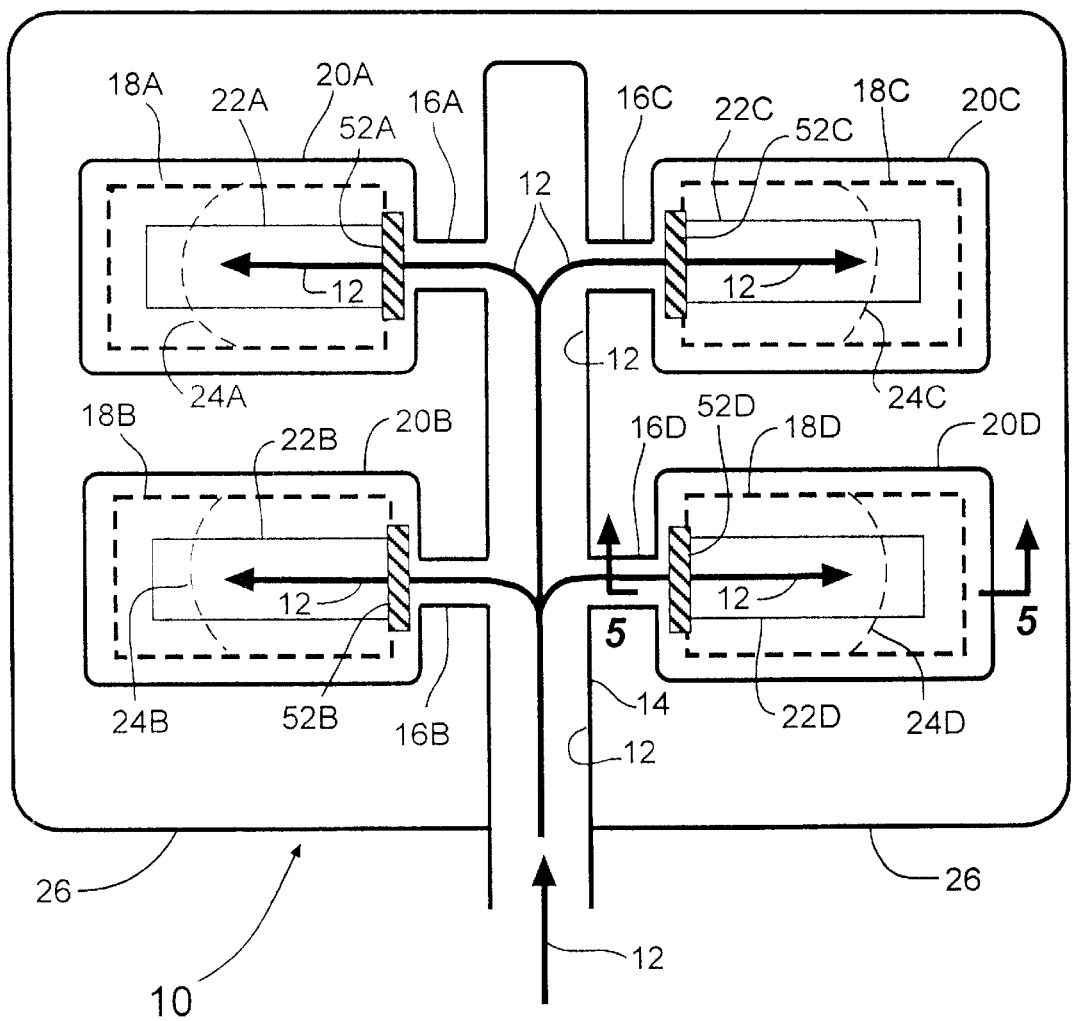
FIG. 4 is a cut-away, plan view of a mold system for making applicant's smart cards wherein a film or layer of an ITA material residing in each card forming cavity is further provided with a splitter edge material at each mold's gate for receiving the thermosetting material.

FIG. 4 shows a plan view of a mold system 10 for making four smart cards simultaneously according to the teachings of this patent disclosure. This mold system 10 differs from in one shown in FIG. 1 by virtue of the fact that each strip of ITA material 22A, 22B, 22C and 22D residing in its respective mold cavity is attached to a respective splitter edge device 52A, 52B, 52C and 52D. Preferably, such splitter edge devices are made as parts of an overall sheet that places the splitter edge components 52A, 52B, 52C and 52D at the entrance of each respective card forming cavity 18A, 18B, 18C and 18D. Thus, these splitter edge devices 52A, 52B, 52C and 52D face the incoming flow of thermoset material 12 at the respective gates 16A, 16B, 16C and 16D of the mold cavities.

Figure 5:
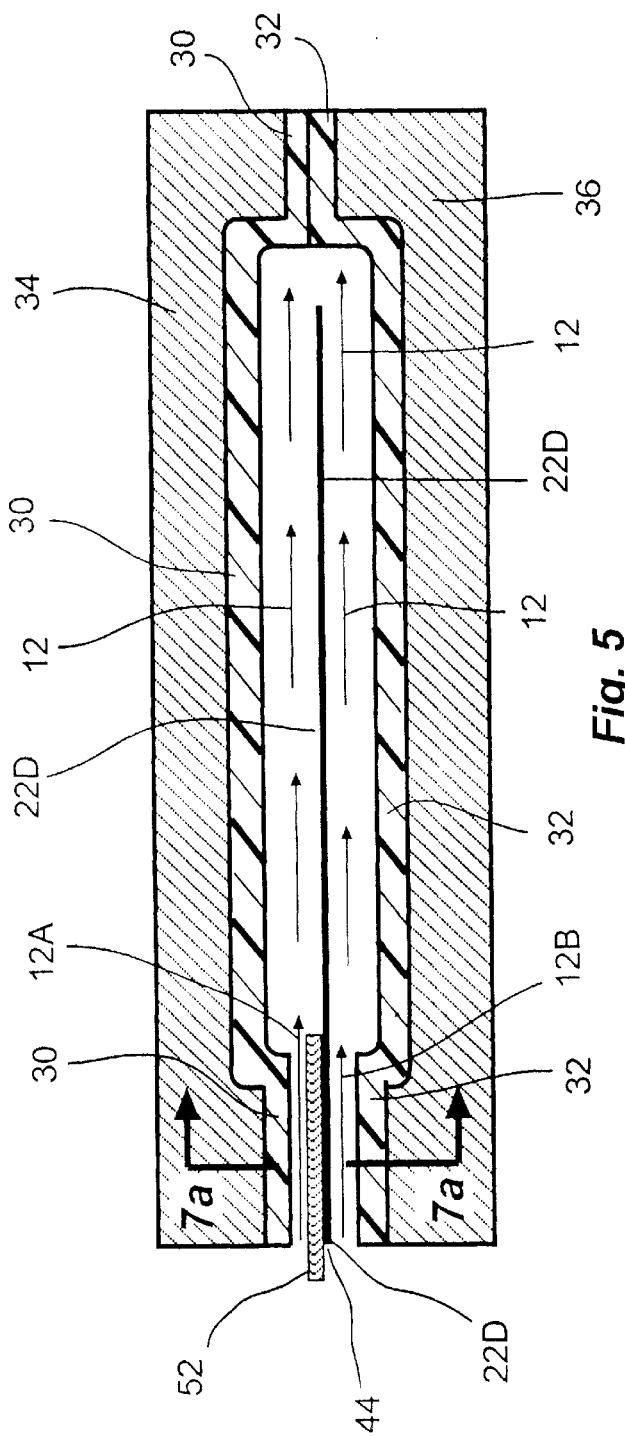
FIG. 5 is a cut-away, side view of a mold system in which a thermosetting polymeric material is being injected into a gate and past a splitter edge associated with a film or layer of an ITA material in a manner taught by this patent disclosure.

FIG. 5 is a cut-away, cross-section view of a smart card system wherein a smart card's ITA film 22D has been properly (i.e., horizontally) positioned by an incoming flow of thermosetting polymeric material 12. The left or front edge 44 of a film-like body of ITA material 22D is shown provided with a layer of splitter edge material 52 which also may be referred to in this patent disclosure as a "splitter edge device 52". Preferably the splitter edge device 52 will be from about 1 to about 10 times the thickness of the ITA material 22D. Preferably the splitter edge device 52 also will be made of a material that is more rigid than the material from which the ITA film is made. The added thickness (and/or rigidity) of the splitter edge material 52 will cause an incoming stream of thermosetting polymeric material 12 to split into two streams 12A and 12B. As depicted in FIG. 5, stream 12A flows over the ITA material 22D and stream 12B flows under said ITA material 22D. This stream splitting action causes the ITA material 22D to take on a substantially horizontal orientation in the core region of the smart card. This circumstance is to be contrasted with the "sagged down" state and orientation of the ITA material depicted in FIG. 2 and the "wave-like" configuration depicted in FIG. 3.

Figure 6:
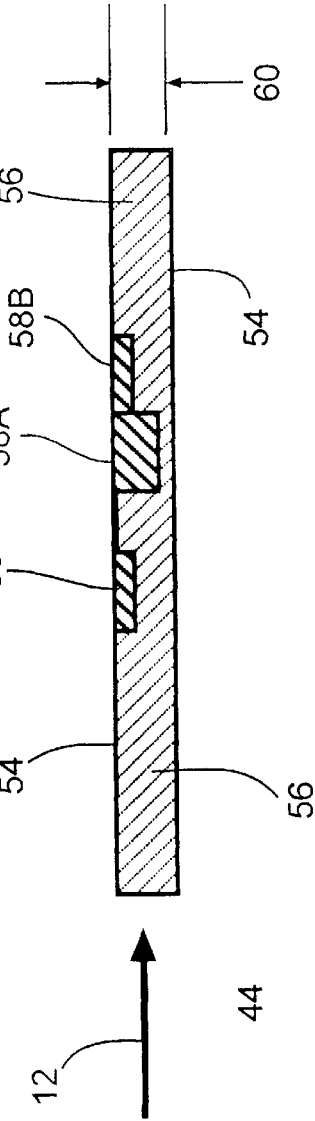
FIG. 6 is a cut-away, side view of a layer, film or sheet of an ITA material having an electrical circuit contained therein that can be used in the practice of applicant's invention.

FIG. 6 shows a cut-away, cross-section view of a prior art ITA material 54. It is comprised of a polymeric film 56 that has electrical conductor materials embedded or dissolved therein. Thus, electrical circuit elements or components 58, 58A, 58B, etc. (e.g., computer ships, antennae, capacitors etc.) can be made a part of the polymeric material 54. For example, such circuit components can be etched into the polymeric material 54 by processes well known to the circuit manufacturing arts. These polymeric materials 54 can be made in sheets having a film-like thickness 60 (e.g., from about 0.013 mm to about 0.25 mm).

Figure 7:
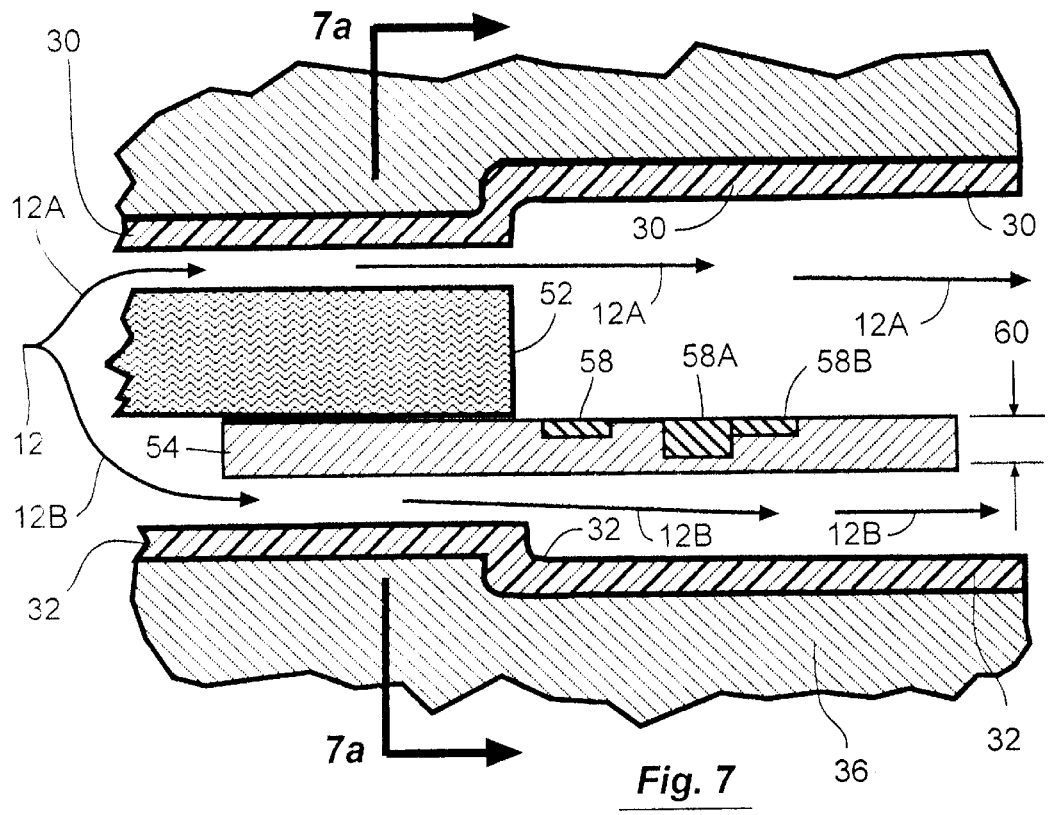
FIG. 7 is a cut-away side view of a layer, film, or sheet of an ITA material that is provided with a splitter edge material according to the general teachings of this patent disclosure.

FIGS. 7 through 13 show various ITA material configurations that can be employed in the practice of this invention. Any such configuration may be referred to as an "ITA-based circuit," "ITA circuit material," "ITA material," "ITA-based circuit," "ITA film," "ITA system," etc. for the purposes of this patent disclosure. For example, FIG. 7 shows an ITA material 54 attached (e.g., by various methods known to those skilled in this such as by gluing, by thermobonding, by co-molding the two material, etc.) to a splitter edge material 52. The splitter edge material 52 will normally be a sheet or layer of polymeric material, cardboard, etc. The splitter edge material 52 will preferably have a thickness of from about 0.025 mm to about 1.27 mm. Preferably, the splitter edge material 52 will have a thickness that is greater than the thickness of the ITA film.

Figure 7A:
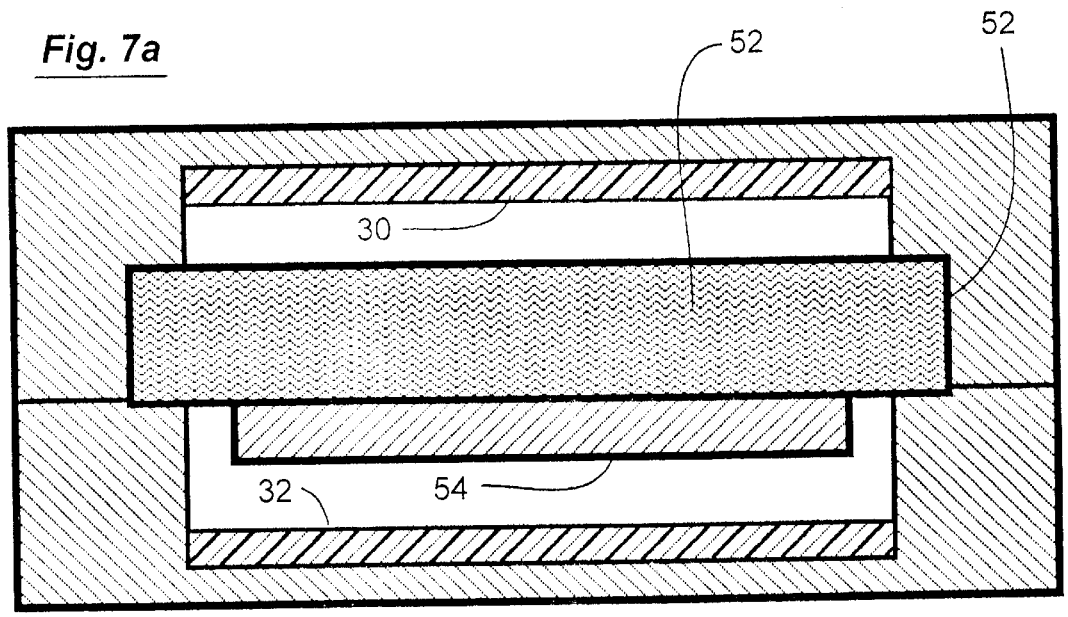
FIG. 7A shows an ITA material and a splitter edge material of FIG. 7 in a cross-section view.

FIG. 7A shows a ITA/splitter edge assembly such as that shown in FIG. 7 in enlarged cross-section. A stream 12 of thermosetting polymeric material 12 is shown being split into two distinct streams 12A and 12B by the presence of the splitter edge material 52 in the flow path of the incoming polymeric material 12. The thickness of the splitter edge material is preferably from about 1 to about 10 times the thickness 60 of the ITA material.

Figure 8:
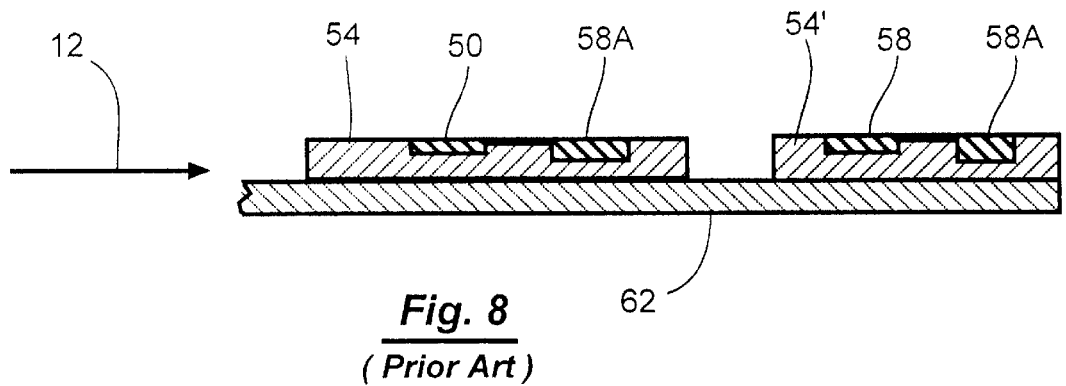
FIG. 8 is a cut-away, side view of a prior art system wherein two sheets of an ITA material are associated with a layer of polymeric material such as polyethylene in a manner such that both sheets of the ITA material are affixed to the same side of the polymeric material.

FIG. 8 shows a prior art arrangement of two distinct sheets of ITA material 54 and 54' attached to a base or substrate, polymeric material 62 such as polyethylene. Polyethylene sheets having thicknesses of about 0.002 millimeters can be effectively used for this purpose.

Figure 9:
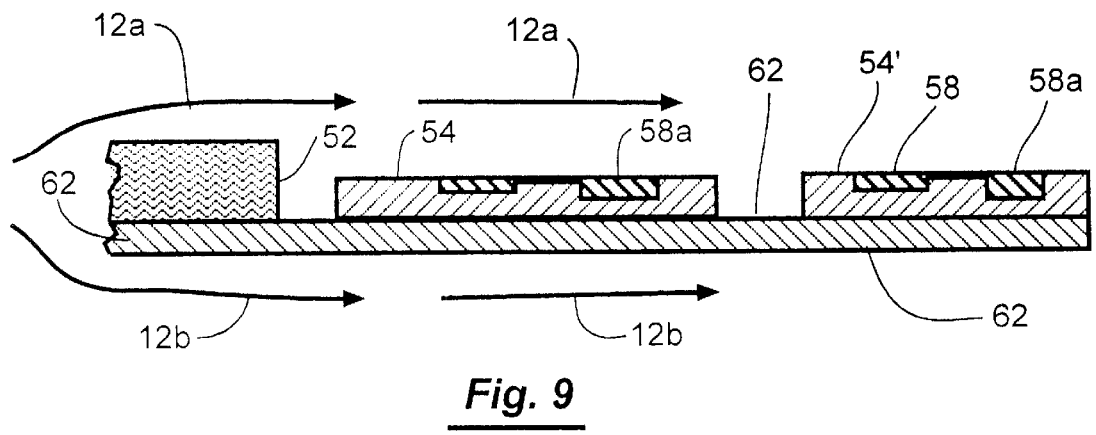
FIG. 9 is a cut-away side view of two sheets of an ITA material attached to a layer of polymeric material in the manner shown in FIG. 8, but wherein a layer of splitter edge material is attached according to the general concept of this invention.

FIG. 9 is a cut-away, side view of a ITA system—like the system depicted in FIG. 8 which has a layer of polymeric material 62 such as polyethylene that supports two distinct ITA circuits 54 and 54'. The system in FIG. 9 is, however, further provided with a splitter edge device 52 which is attached to the left side of the polymeric layer 62.

Figure 10:
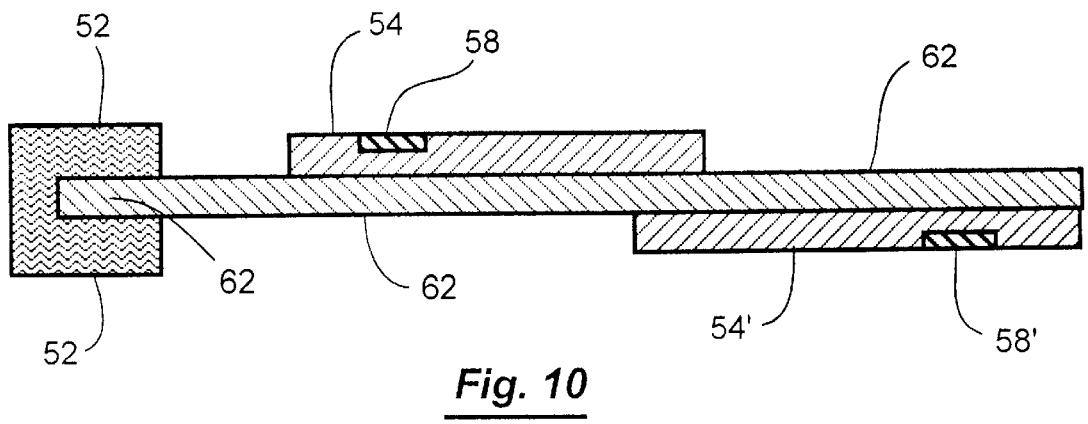
FIG. 10 is a cut-away, side view of a smart card circuit device comprised of two sheets of an ITA-based material that are separated from each other by a sheet of polymeric material. According to the teachings of this patent disclosure, the leading edge of the polymeric material is provided with a splitter device.

FIG. 10 shows an ITA circuit system wherein the left side of a layer of polymeric material 62 is mounted in the interior of a splitter edge material 52. The layer of polymeric material 62 separates two ITA film materials 54 and 54'.

Figure 11:
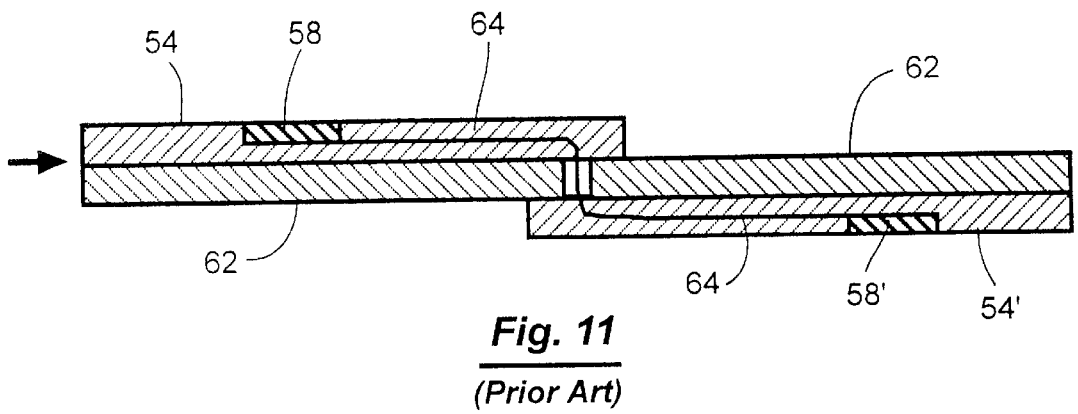
FIG. 11 is a cut-away side view of a prior art smart card circuit device comprised of two separate sheets of ITA material that are electrically associated with each other via an opening in the center layer of a polymeric material that separates the two sheets of ITA material.

FIG. 11 shows a prior art ITA system comprised of an ITA material 54 attached to the top side of a polymeric material 62 such as polyethylene and an ITA material 54' attached to the underside of the polymeric material 62. ITA components 58 and 58' are electrically connected to each other via an electrical connector element 64 that passes through the layer of polymeric material 62.

Figure 12:
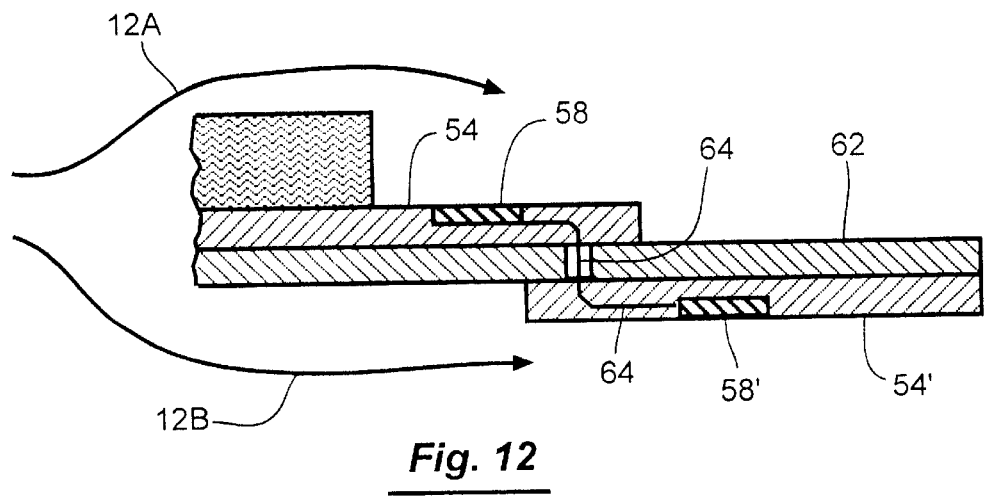
FIG. 12 depicts another embodiment of this invention wherein an ITA material the splitter layer of material is associated with one of the ITA materials rather than with the polymeric material.

FIG. 12 shows the ITA-based circuit shown in FIG. 11 provided with a splitter edge material 62 that is affixed to the upper layer of ITA material 54.

Figure 13:
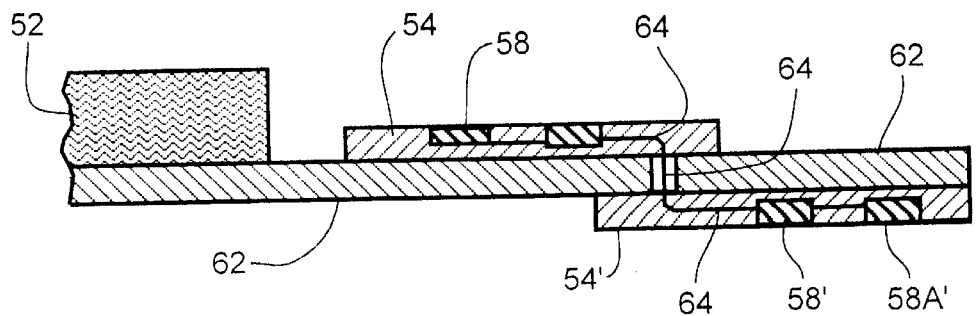
FIG. 13 is a cut-away, side view of an embodiment of this invention wherein a smart card circuit device is comprised of two separate sheets of ITA material that are associated with a center layer of polymeric material to which a splitter edge material is attached.

FIG. 13 shows an embodiment of the ITA-based circuit of FIG. 11 provided with a splitter edge 52 that is affixed to the polymeric layer 62 rather than the ITA film 54.

Figure 14:
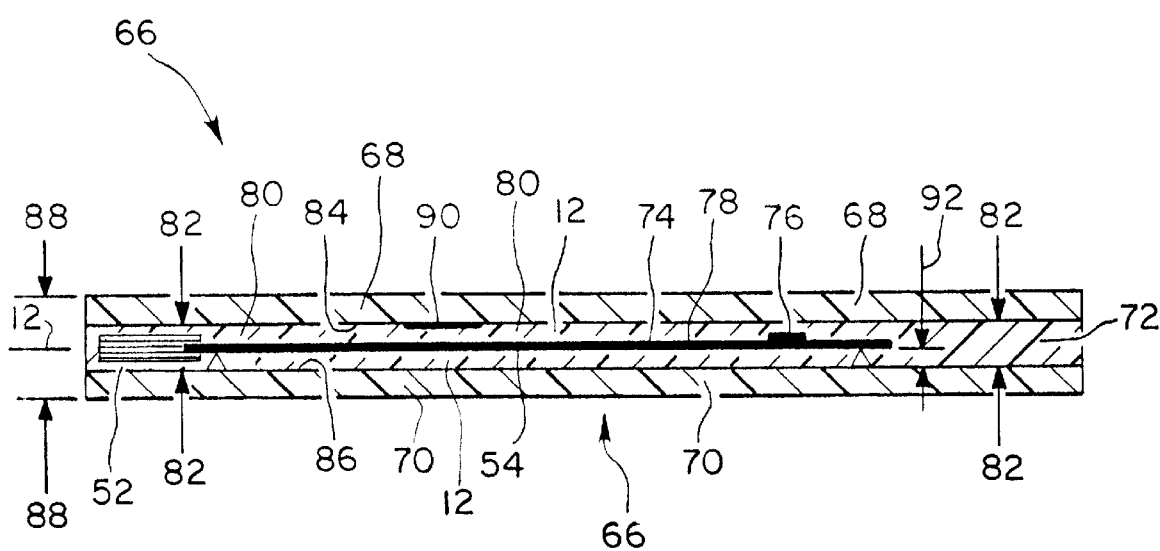
FIG. 14 is a cut-away, side view of a contactless type smart card having an ITA material embedded in its center or core region and which was made by providing such ITA material with a splitter device.

FIG. 14 depicts a cut-away side view of a smart card 66 made according to the teachings of this patent disclosure. In its finished form, such a smart card will be comprised of a top layer 68, a bottom layer 70, and a center or core layer 72 in which a film or layer of ITA-based circuit material 74 resides in a substantially horizontal orientation, near the center of the core layer 72. The electronic circuit components in the ITA material 74 could be, by way of example only, an antenna 76, a computer chip 78, etc. In any case, these ITA-based circuit components are embedded in a thermosetting polymeric material 12 (e.g., an initially liquid or semi-liquid thermosetting resin) that, upon curing, constitutes the solid, center or core layer 72 of a finished smart card. The thermosetting polymeric material 12 that eventually becomes the center or core layer 80 of the smart card is injected into a void space 82 between the top layer 68 and bottom layer 70. This injected polymeric material 12 is preferably capable of being injected under relatively cold, low pressure forming conditions.

Such thermosetting polymeric materials 12 are injected into, and fill, the void space 82 defined between the inside surface 84 of the top layer 68 and the inside surface 86 of the bottom layer 70. Upon curing, the polymeric material 12 of the center or core layer 80 should bond or otherwise adhere to both the inside surface 84 of the top layer 68 and the inside surface 86 of the bottom layer 70 to produce a unified card body. Such adherence can be aided by treating the inside surfaces 84 and 86 of the top layer and the bottom layer in any one of several ways. For example, bonding agents known to this art may be employed to enhance bonding between the core layer-forming thermoset material and the material(s) from which the top and bottom layers are made (e.g., PVC). By way of example only, Minnesota Mining and Manufacturing's base primer product 4475® can be used for this bond enhancing purpose—especially when the top or bottom layer material is made of PVC. Other treatments that can be applied to the inside surfaces of the top and/or bottom layers could include plasma corona treatments and acid etching. The smart card's thickness 88 is defined by the placement of mold faces (not shown in FIG. 14) as the thermoset material 12 is injected into the void space 82. In effect, the injection of the thermoset material 12 into the void space 82 between the top and bottom layers fills any portion of that void space 82 that is not otherwise occupied by the splitter device 52 or by the layer of ITA-based circuit material 54.

FIG. 14 also illustrates how the inside surface of the top and/or bottom layers 68 and/or 70 also may be provided with strips of film 90 bearing alphanumeric and/or graphic information and designs. Thus, if the top layer 68 were made of a translucent polymeric material such as PVC, the alphanumeric/graphic information on strip 90 would be visible to the card user. For example, in FIG. 14 such a alphanumeric/graphic information-containing film strip 90 is shown positioned on the inside surface 84 of the top layer 68. The inside surfaces of these layers also may be provided with layers of materials such as film layers or coatings whose function is to increase (or reduce) the opacity of the card body so that its electronic components are not visible through the card body.

Next, it should be noted that the smart card's ITA-based circuit material 54 is preferably positioned in a substantially horizontal orientation, about halfway between the inside surface 86 of the bottom layer 70 and the inside surface 84 of the top layer 68. This orientation and positioning of the ITA-based circuit 54 is achieved at least in part by virtue of the fact that a splitter edge device 52 was placed in the line of flow of the incoming liquid thermosetting polymeric material 12 that enters a gate and then eventually forms a solid core region 80 of the smart card. That is to say that splitter edge device 52 will cause the incoming liquid or semi-liquid polymeric material 12 to flow under the ITA film 54 as well as above it and thereby immerse said film 54 from above, below and from the sides. In the more preferred embodiments of this invention the underside of the film or layer of ITA material 54 does not come into direct physical contact with the inside surface 86 of the bottom layer 70, but rather is entirely immersed in the incoming thermosetting material 12. This circumstance enables the ITA material 54 to better resist any flexure and/or torsion forces the smart card may encounter upon either or both of its major outside surfaces or on any of its four outside edge surfaces. In some of the more preferred embodiments of this invention the ITA material 54 will be positioned at a distance of from about 0.075 mm to about 0.13 mm above the inside surface 86 of the bottom layer 70.

Figure 15:
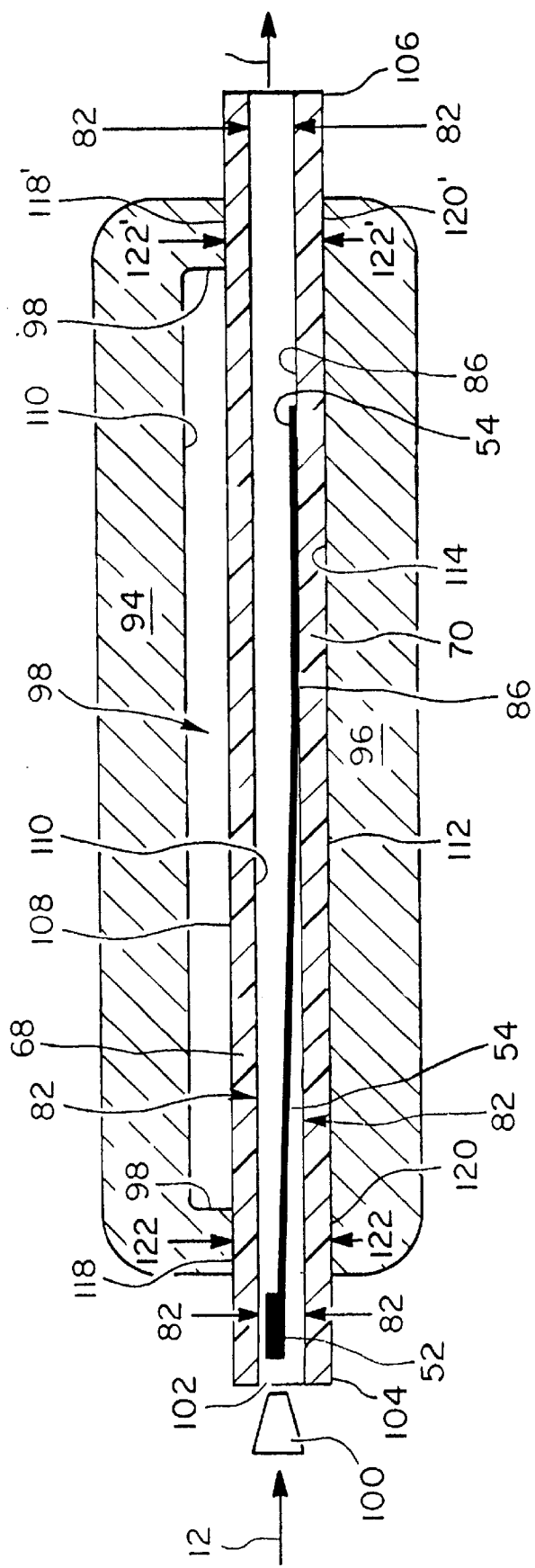
FIG. 15 is a cut-away side view of a mold tool set up for making a first preferred embodiment of this invention wherein certain smart card components are shown before a liquid polymeric material is injected into a core region between the card's top and bottom layers.
Figure 16:
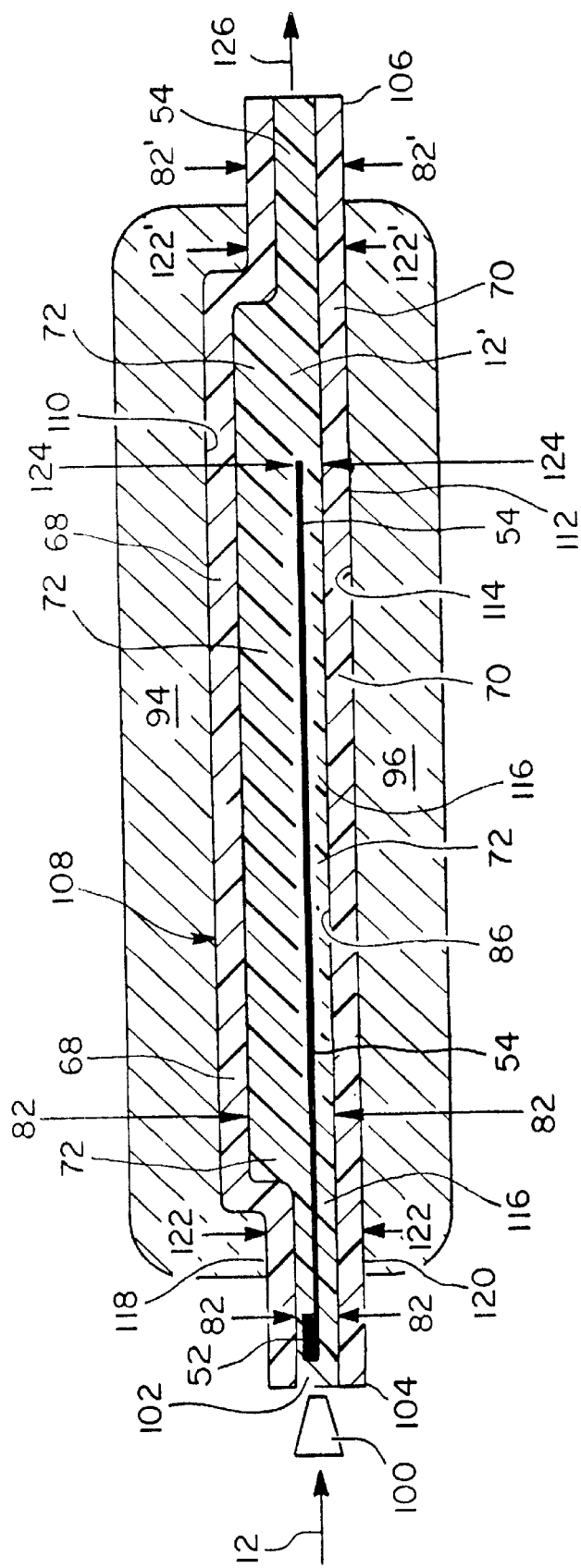
FIG. 16 shows the system depicted in FIG. 15 after a polymeric material is injected into the void space between the top and bottom layers and thereby filing said void space with a polymeric material and forming (preferably by a cold forming operation) the top layer of the smart card to the contour of the top mold's card-forming cavity and positioning the ITA material in a substantially horizontal orientation in the center of the card's core region.

FIGS. 15 and 16 illustrate a first preferred embodiment of applicant's methods for making smart cards using a splitter device 52 on an ITA material 54. FIG. 15 depicts a particularly preferred embodiment of this invention wherein a flat, top layer or sheet of plastic material 68 such as PVC is shown before it is formed (and preferably cold, low pressure formed) according to the teachings of some preferred embodiments of this patent disclosure. In other words, FIG. 15 depicts a mold tool set-up just prior to the injection of the polymeric material 12. In this set up, a flat, top layer 68 (e.g., a flat sheet of PVC) is shown as it is initially placed under a card-forming cavity 98 of a top mold half shell 94. A bottom layer 70 (e.g., another flat sheet of PVC) is shown as it is placed over a bottom mold half shell 96. Again, however, in some less preferred, but still viable, embodiments of applicant's processes the top layer 68 may be pre-molded or at least partially pre-molded, preferably, to the general contour of the card-forming cavity 98 in the top mold half shell 94. By way of comparison, the bottom mold half shell 96 has no cavity comparable to the cavity 98 in the top mold half shell 94. In FIG. 15, the ITA material 54 is shown in a "sagging down" stage such that it rests on the top surface 86 of the bottom layer 70.

FIG. 16 depicts the effects of injecting the thermoset polymeric material 12 into the void space 82 between the top layer 68 and bottom layer 70. It shows the top layer 68 after it has been molded into a card-forming cavity 98 in the top mold half shell 94 (see FIG. 15). A nozzle 100 for injecting a liquid or semi-liquid, thermoplastic or thermosetting polymeric material 12 is shown being inserted into an orifice 102 that leads to the void space 82 shown in FIG. 15 that is defined between the inside surface 84 of the top layer 68 and the inside surface 86 of the bottom layer 70. The void space 82 extends from the left end 104 to the right end 106 of the juxtaposed top layer 68 and bottom layer 70. In FIG. 15 the outside surface 108 of the top layer 68 is not yet in contact with the inside surface 110 of the card-forming cavity 98 of the top mold half shell 94. By way of contrast, the outside surface 112 of the bottom layer 70 is shown in substantially flat, abutting contact with the inside surface 114 of the bottom mold half shell 96.

In FIG. 16 the ITA-based circuit 54 is shown positioned above the inside surface 86 of the bottom layer 70. Preferably, the ITA circuit material 54 will be positioned above the inside surface 86 of the bottom layer 70 at a distance 124 of from about 0.075 mm to about 0.13 mm. In other words, the incoming thermoset polymeric material 12 will have invaded the region 116 under the ITA-based circuit 54 to such an extent that the ITA material 54 is elevated to a preferred level wherein the distance 124 shown in FIG. 16 is from about 0.075 to about 0.13 mm. Again, such a position for the ITA-based circuit 54 is preferred because the presence of the thermoset polymeric material 54 under the electronic components tends to augment the protection of the ITA circuit 54 against any forces or shocks that may be received by the outside surfaces (i.e., the outside of the bottom layer and/or the outside of the top surface) of the card.

FIG. 16 shows how molding a process such as a cold, low pressure forming process of this patent disclosure has in fact conformed the top surface 108 of the top layer 68 to the configuration of the card-forming cavity 98 in the top mold half shell 94 that is shown in FIG. 15. Again, the outside surface 112 of the bottom layer 70 is shown in FIG. 16 molded against a substantially flat inside surface 114 of the bottom mold half shell 96. This is a particularly preferred arrangement for making the smart cards of this patent disclosure.

In FIGS. 15 and 16 a front lip or jaw region 118 of the top mold half shell 94 and a front lip or jaw region 120 of the bottom mold half shell 96 are shown spaced apart from each other by a distance 122 that (taking into consideration the thickness of the top and bottom layers 68 and 70), in effect, defines the width of the void space between the top layer 68 and the bottom layer 70 at these lip or jaw regions 118 and 120 of the two molds 94 and 96. This distance 122 should be such that the thermosetting polymeric material 12 can be injected into the void space 82 over the entire length of the card (e.g., from its left end 104 to its right end 106). The counterpart distance 122' of the mold system on the right side of the system shown in FIGS. 15 and 16 may differ from that of its counterpart distance 122 on the left side. In any case the distance 122' should be such that the distance 82' defined between the inside surface 110 of the top layer 68 that passes through the rear lip 122' of the top mold 94 and the inside surface 86 of the bottom layer 70 that passes through the rear lip 120' of the bottom mold 96 is very small—but still finite. That is to say that this very small distance 82' is preferably large enough to allow gases 126 (e.g., air, polymeric ingredient reaction product gases, etc.) in the void space 82 that originally existed between the top and bottom layers 68 and 70 and excess polymeric material to be exhausted from the rear (i.e., right side) of the void space 82, but still be small enough to hold the injection pressures used to inject the thermoset polymeric material 12. Indeed, the distance 82' is preferably sized large enough to allow even thin layers of the liquid polymeric material 12 itself to be "squirted" or "flashed" out of the void space—and thus allowing all gases residing in, or created in, the void space 82 to be expunged out of the rear or right side of said void space (i.e., near where the width of the void space is depicted with distance arrows 82') and, indeed, out of the mold system itself. Thus, all such gases 126 are completely replaced by the incoming liquid thermoset material 12'. This gas exhaust technique serves to prevent gas bubbles from forming in the body of the thermoset material 12' that eventually (i.e., upon curing of the thermoset material 12) comprises the center or core layer 72.

Figure 17:
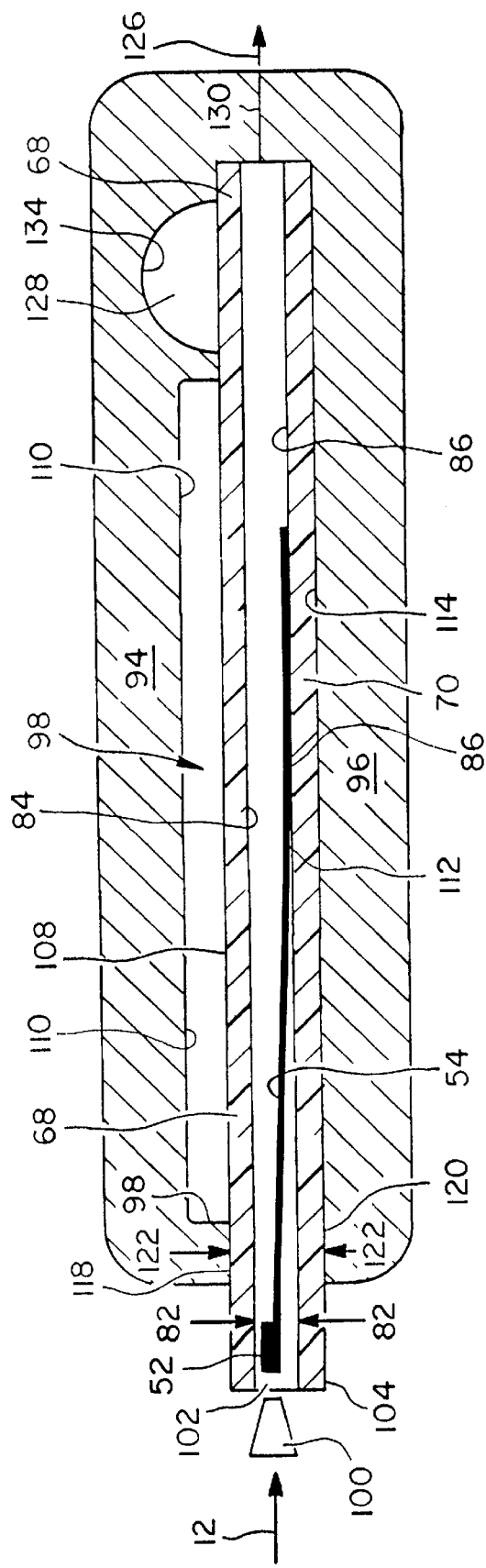
FIG. 17 depicts another preferred embodiment of this invention wherein the mold tool shown in FIG. 15 is further provided with an excess polymeric material and/or gas receiving receptacle.
Figure 18:
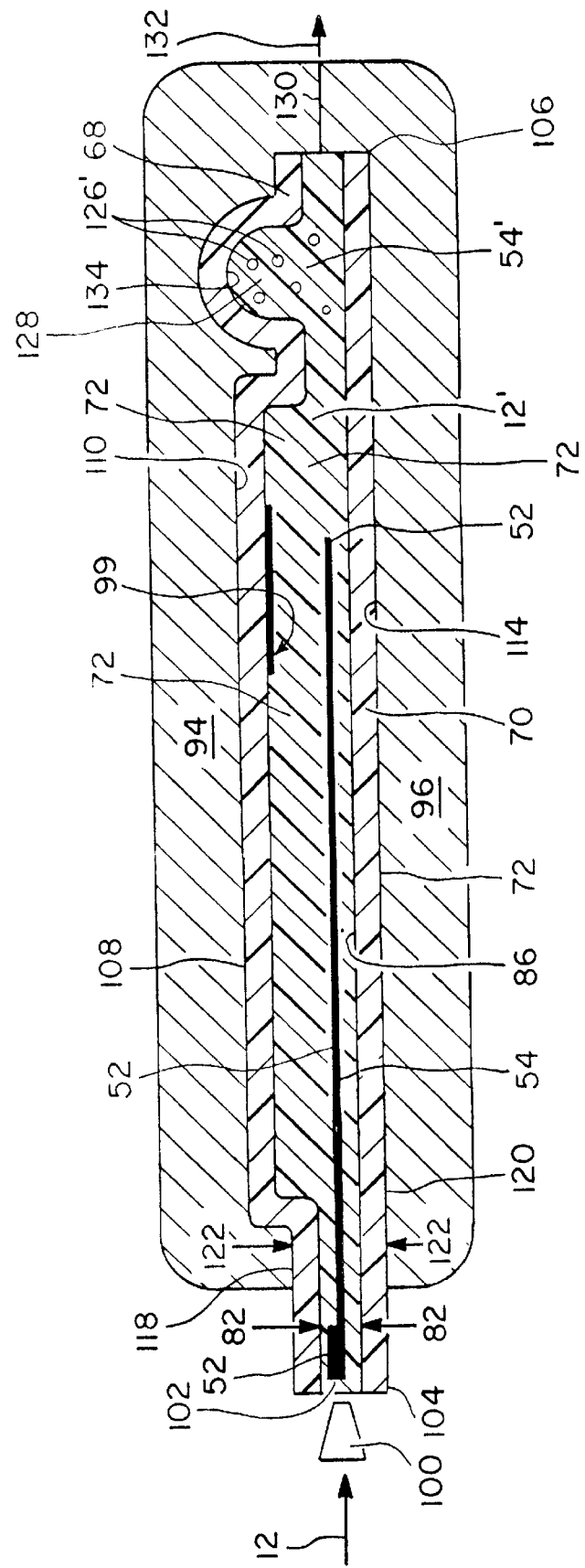
FIG. 18 depicts the result of injecting the mold system depicted in FIG. 17 with a thermosetting polymeric material (preferable under the cold forming, low pressure conditions).

FIGS. 17 and 18 depict an even more preferred embodiment of the molding process that was generally illustrated in FIGS. 15 and 16. In FIGS. 15 and 16, the rear or right side 106 of the top and bottom layers 68 and 70 are shown protruding out of their respective molds 94 and 96. Consequently, the gases 126 (air and chemical reaction product gases) and "excess" polymeric material (i.e., polymeric material 12 in excess of that required to fill the void space 82) are expunged or exhausted out of the molds 94 and 96. This mold and exhaust arrangement may work better with some thermoset injection materials (and some top and bottom layer materials) than it does with others. Applicant has, however, also found that in some cases, the overall mold system depicted in FIGS. 15 and 16 is sometimes left with residual bodies of solidified excess polymeric material 12' that, in one way or another, interferes with the manufacture of succeeding smart card(s). In effect this arrangement sometimes leaves the overall mold device in a "dirty" condition that is not conducive to making high quality smart cards in succeeding cycles of the high speed molding operations employed in making such cards.

The embodiment of applicant's invention shown in FIGS. 17 and 18 can be used to correct this problem. It does this through the use of a top mold 94 that also has an excess material receptacle cavity 128. The function of this excess material receptacle cavity 128 is to receive and hold any excess thermoset material and any gases 126 (air, chemical reaction product gases) purged from the void space 82 by the injection of the polymeric material 12 in said void space. Indeed, in some of the more preferred embodiments of this invention, excess polymeric material 12 will be purposely injected into the void space 82 in order to drive out any gases 126' that would otherwise be entrapped or entrained in the center layer 80 of the card. Applicant's excess material injection procedure may entrap some of these gases in the excess polymeric material 54' in the manner generally indicated in FIG. 18 or some or all of these gases may be exhausted from the mold system at its parting line 130 as suggested by the direction of arrow 132. Again the "excess" thermoset material in the excess material receptacle 128 is eventually trimmed from such "precursor" cards in order to create a "finished" card. It also should be noted that in this preferred embodiment of applicant's process, the top layer 68 is molded into the top regions 134 of the excess material receptacle 128 in the same general way that the top layer 68 is molded into the card forming cavity 98. FIG. 18 also shows that the inside surfaces of the top and/or bottom layers can be provided with various films, e.g., those that carry alphanumerical/design information or provide certain qualities to the card, e.g., such a film could provide the card with opacity enhancing qualities.

Figure 19:
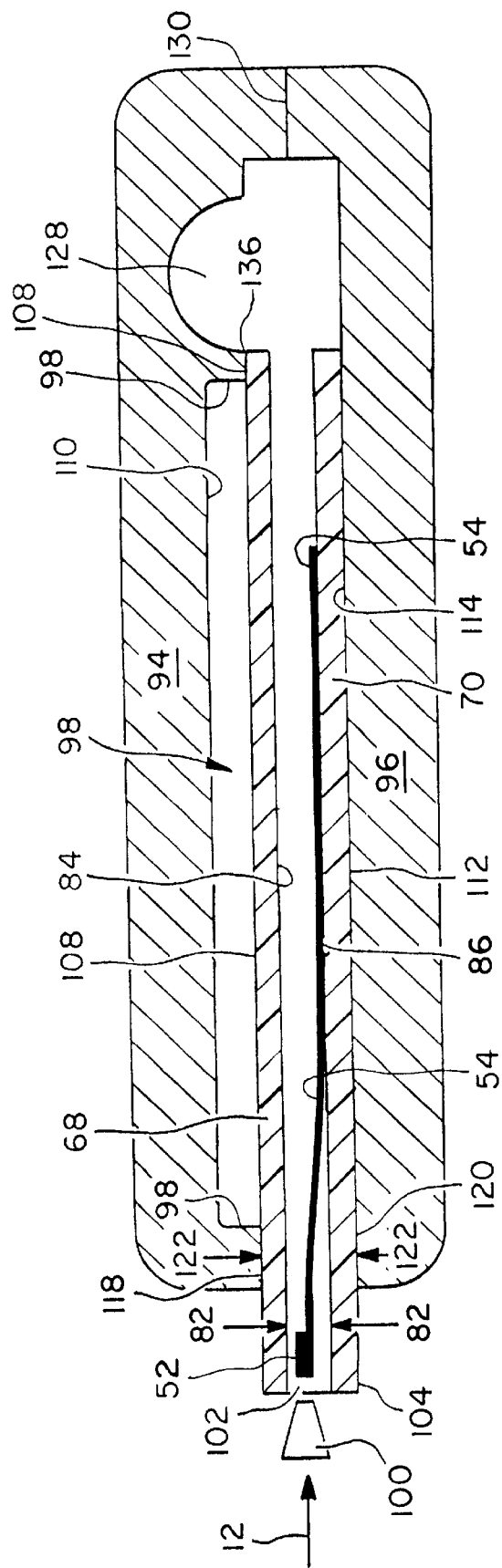
FIG. 19 illustrates another preferred embodiment of this invention wherein the sheet or layer components depicted in the mold tool set up that respectively form the top surface and the bottom surface of applicant's cards terminate at the edge of a excess material receiving receptacle.
Figure 20:
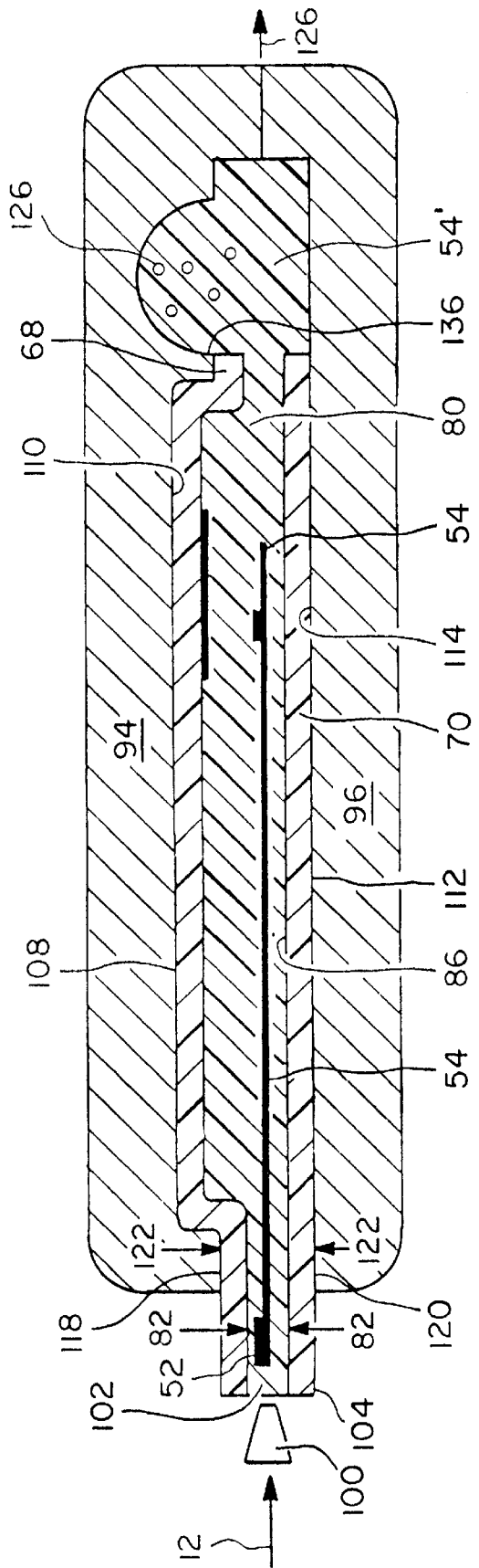
FIG. 20 shows the system shown in FIG. 19 after the void space (and the excess material receptacle) is filled by injection of a thermosetting polymeric material therein.

FIGS. 19 and 20 depict another preferred embodiment of this invention wherein the top layer 68 and the bottom layer 70 only extend to the front edge of the excess material receptacle 128. Thus, the top layer 68 is not molded into the excess material receptacle 128 as it was in the case shown in FIG. 18. In the embodiment shown in FIG. 20, entrapped gases 126 and excess polymeric material 54' are not entirely ejected from the mold cavity system, as they were in the process shown in FIG. 16, but rather are "captured" in an excess material receptacle 128 that itself also resides in the overall mold cavity system. It also should be noted that, in FIGS. 19 and 20 the top 108 of the top layer 68 does not extend into the receptacle 128 as it did in the system depicted in FIG. 18. Those gases 126 that are not entrapped in the excess polymeric material 54' may be, and preferably are, exhausted from the mold system at its parting line 130.

Figure 21:
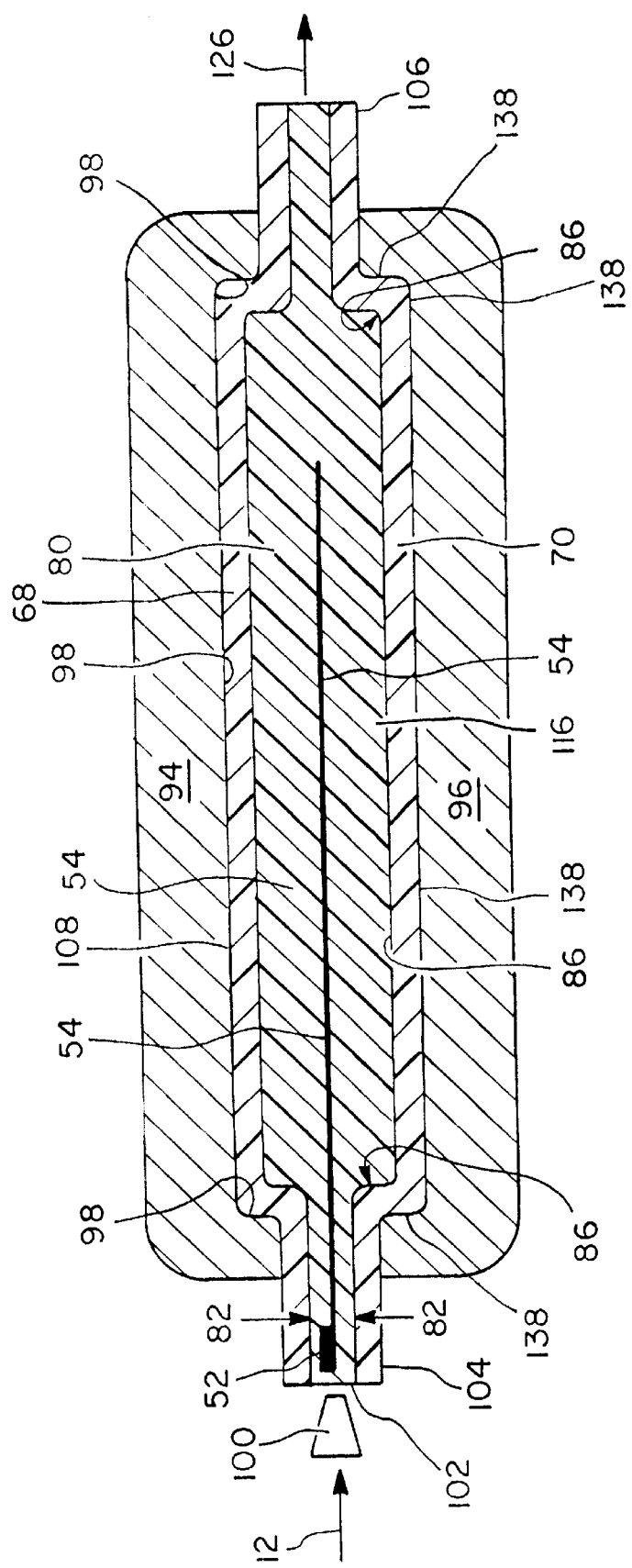
FIG. 21 is a cut-away side view of a mold tool set up that has made a second embodiment of this invention wherein both the top layer and the bottom layer are each molded in their respective mold cavities.

FIG. 21 illustrates a somewhat less preferred, but still viable, embodiment of this invention wherein the bottom mold 96 is provided with a cavity 138 much in the way that the top mold 94 has such a cavity 98.

Figure 22:
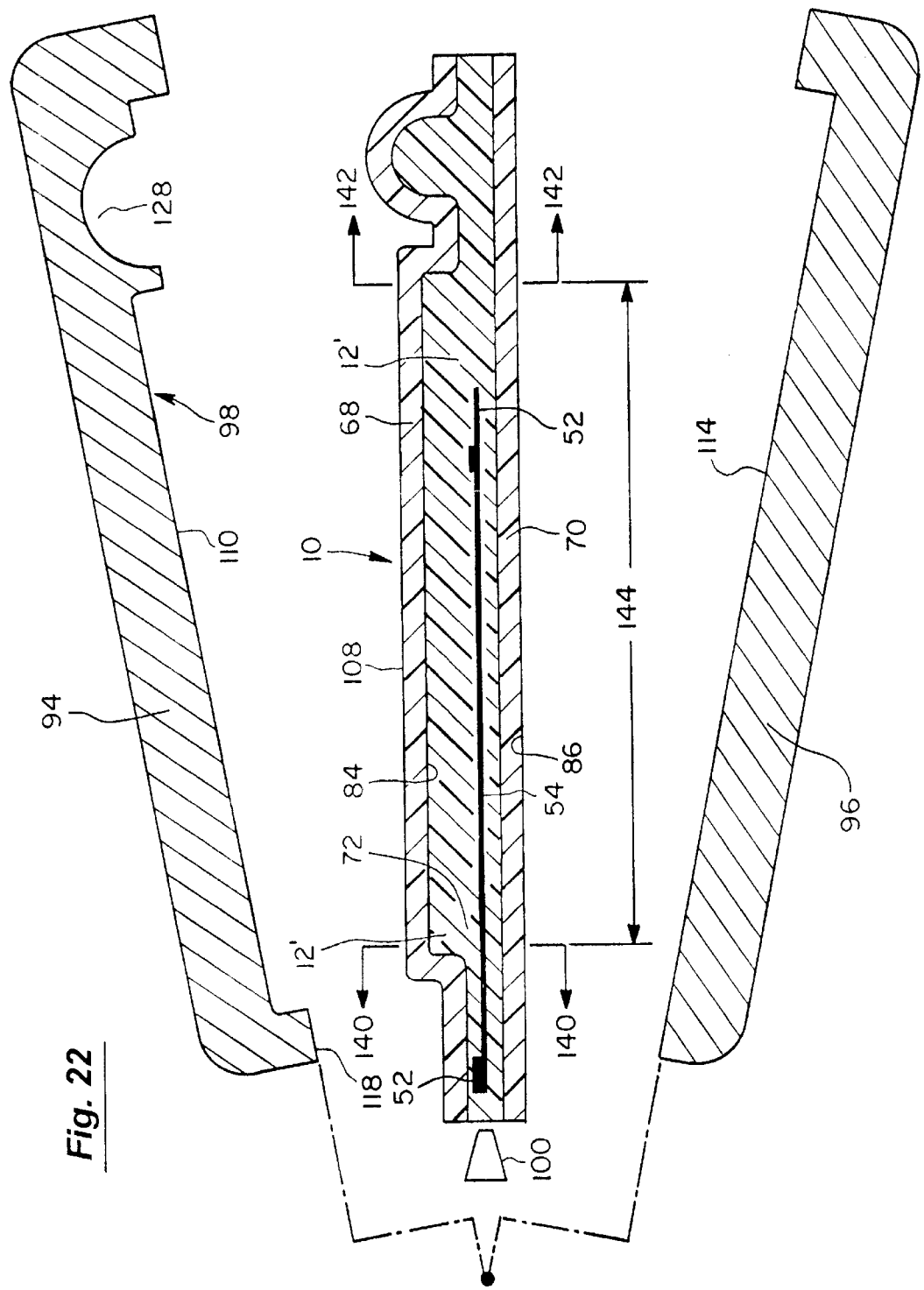
FIG. 22 is a cut-away view showing a mold tool being removed from a precursor smart card body formed by the system generally depicted in FIG. 18.

FIG. 22 shows a semi-finished or precursor smart card of the type shown in FIG. 18 being removed from a mold system. Section lines 140—140 and 142—142 respectively show how the left end and right end of the precursor smart card can be cut or trimmed away to create the sharp edges and precise dimensions of a finished smart card. Again, by way of example, ISO Standard 7810 requires that such cards have a length 144 of 85 mm.

FIGS. 23(A) through 23(E) contrast various gates into which a thermosetting polymeric material 12 could be injected in order to form a given smart card. For example, FIG. 23(A) depicts a prior art gate configuration Q, R, S, T commonly referred to as a fan type gate. The term "fan" refers to the fan-like, general configuration of the gate into which a thermoset polymeric material 12 is injected from a runner 146 that feeds the various gates in manifold fashion. The fan-like gate configuration shown in FIG. 23A is often employed with prior art, hot, high pressure molding procedures. The narrowest part Q, R of the fan Q, R, S, T is shown provided with an injection port 148 for receiving the incoming liquid, thermoset polymeric material 12. As can be better seen in FIG. 23AA, the injection port 148 of such a prior art systems has a relatively small diameter 150, relative to the width 152 of the fan (i.e., the distance from points S to point T in FIG. 23A) in the region where the gate feeds into the cavity that forms the general outline S, T, U, V of the smart card to be formed.

By way of contrast, FIGS. 23(D) to 23(E) depict some of applicant's more preferred gate configurations. It might also be noted here that applicant prefers to taper these gates in the manner previously described, but which can not be shown in FIGS. 23(B) to 23(E). In any event, the diameters of applicant's gates are significantly larger than the gates used in prior art smart card molding processes. For example the diameter 150 of the injection port 148 of such prior art systems may be something on the order of 7.0 mm while the width of the fan along the line extending from point S to point T (which is also the nominal width of the credit card to be formed) is about 54 mm (as per the requirements of ISO Standard 7810). Hence, as seen in the cross sectional view depicted in FIG. 23AA, the diameter of the prior art injection port 148 of FIG. 23(A) which leads from the main polymeric material supply runner 146 to the injection port 148 is about ⅒ of the width 152 of the edge of the card to be formed. Such relative dimensions (an injection port that is about ⅒ as wide as the edge of the card being serviced by that gate) suffice in most prior art manufacturing methods wherein hot, high pressure forming conditions are being applied to a thermoplastic material. For example, some prior art processes inject their polymeric materials at temperatures ranging from in excess of 200° F. to 1000° F. at pressures ranging from 500 to 20,000 psi. Again such high temperature and high pressure conditions differ considerably from those low temperature and pressure conditions that are preferably employed in applicant's processes.

By way of contrast with such prior art runner gate systems, such as the one depicted in FIG. 23(A), several of applicant's injection port systems, are illustrated in FIGS. 23(B) to 23(E). Applicant's injection port systems are characterized by their relatively wide gates. For example, applicant has found that under the more preferable cold, low pressure conditions (e.g., 56° F. to 100° F. and atmospheric pressure to 200 psi) employed in applicant's preferred processes, higher quality precursor cards (and hence finished cards) are produced when the width or diameter 150' of an injection port 148' for a gate is considerably wider than those employed in prior art manufacturing methods. To this end, FIGS. 23(B) through 23(E) illustrate four variations of applicant's "wide injection port" concept. In FIG. 23(B), for example, the diameter 150' of injection port or gate 148' is about 50 percent of the width 152' the precursor card to be formed. In FIG. 23(C) the width 150' of the injection port or gate 148' is about 80 percent of the width (the distance from point S' to point T' ) of the precursor card. In FIG. 23(D) the width 152' of the injection port or gate 148' and the width (the distance from point S' to point T') of the precursor credit card (S', T', U', V') are substantially the same. FIG. 23(E) depicts a card molding system wherein the width 150' of the gate is greater (e.g., about 25% greater) than the width 152' of the edge of (depicted by the distance from point S' to point T') of the precursor smart card S', T', U', V'. In general, applicant has found that the best results are obtained when the width 150' of his gates are from about 25% to about 200% of the width (the distance from point S' to point T') of the edge of the precursor card serviced by the gate. This contrasts sharply with most prior art (high temperature/high pressure) systems where the width of the injection port (again note the distance from point Q to point R in FIG. 23(A)) is usually less than about 10 percent of the width (the distance from point S to point T) of the edge of the card being serviced by that gate.

Figure 24:
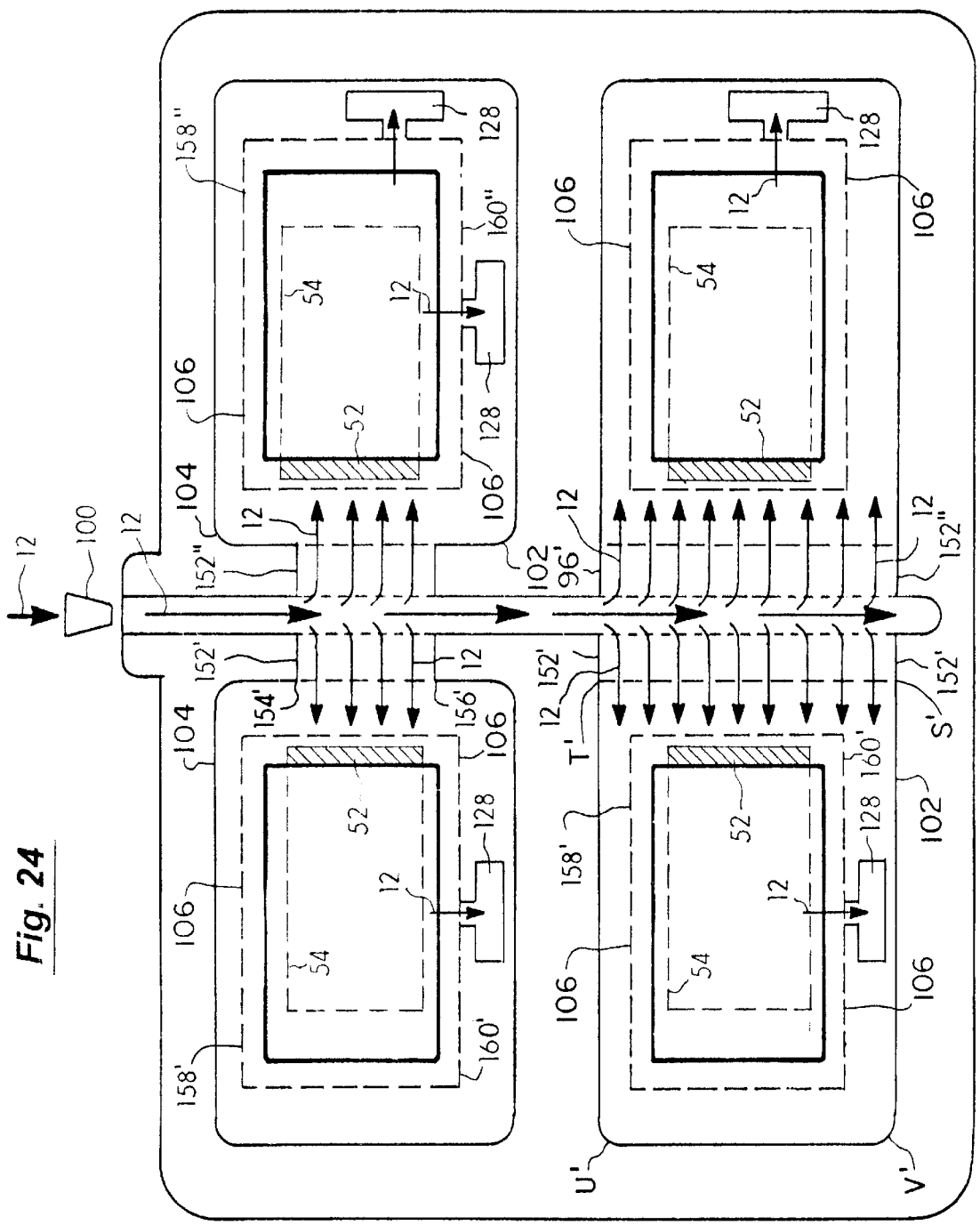
FIG. 24 depicts a mold tool system capable of making multiple (i.e., four) smart cards simultaneously according to the teachings of this patent disclosure.

FIG. 24 illustrates a molding procedure being carried out according to some of the preferred embodiments of this patent disclosure wherein four credit cards are being molded simultaneously in a system wherein, by way of example only, the closest two cavities (closest to the injection nozzle 100) are being fed with an incoming thermoset polymeric material 12 by gates 152' and 152" respectively. These gates have a width (e.g., the distance from point 154' to point 156') that is about one half of the width of the precursor card 106 (the distance from point 158' to point 160') while the two more remote (i.e., more remote from the injection nozzle 100) card-forming cavities have injection ports and gates that are about as wide as the width (158' to 160') of the precursor card itself. The dotted line 106 shown in FIG. 24 depicts the outline of a finished smart card after the edges have been trimmed to (a given size and to eliminate the excess thermoset material in the excess material receptacles 128) to produce a finished smart card (e.g., one having a length of 85 mm and a width of 54 mm as per ISO Standard 7810). Again, these cards may be further "finished" by application of alphanumeric/graphic information on their major exterior surfaces, e.g., by various printing and/or film application procedures known to those skilled in this art.

While this invention has been described with respect to various specific examples and a spirit which is committed to the concept of positioning a ITA-based circuit near the center of thermosetting polymer core region of a smart card, it is to be understood that the hereindescribed invention should be limited in scope only by the following claims.

Thus having disclosed this invention, what is claimed is:

1. A process for making a smart card comprising a top layer, a core layer in which an ITA-based circuit is embedded and a bottom layer, said process comprising:
   (1) associating a splitter edge device with a ITA-based circuit to form a splitter edge device/ITA-based circuit assembly;
   (2) placing the splitter edge device/ITA-based circuit assembly in a gate region wherein a liquid thermosetting material is injected into a void space between the top layer and the bottom layer;
   (3) placing the splitter edge device/ITA-based circuit assembly over a bottom layer of a polymeric material in a bottom mold;
   (4) positioning a top layer under a top mold;
   (5) closing the top mold to the bottom mold in a manner that creates a void space between the top layer and bottom layer;
   (6) injecting the liquid thermosetting polymeric material into the void space at temperature and pressure conditions which are such that: (a) the ITA-based circuit is immersed in a central region of the thermosetting material, (b) the ITA-based circuit is not in contact with the bottom layer, (c) at least one layer of the smart card is at least partially molded into a cavity in the top mold, (d) gases are driven out of the void space, (e) the ITA-based circuit is encapsulated in a cured form of the thermosetting polymeric material and (f) the thermosetting polymeric material bonds with both the top layer and the bottom layer to produce a unified precursor smart card body;
   (7) removing the unified precursor smart card body from the mold device; and
   (8) trimming the precursor smart card to a desired dimension to produce a smart card.

2. The method of claim 1 wherein the splitter edge device has a thickness which is at least twice the thickness of the material that forms the ITA-based circuit.

3. The method of claim 1 wherein the splitter edge device is made from a material that is more rigid than the material from which the ITA-based circuit is made.

4. The method of claim 1 that further comprises use of a top mold that is provided with an excess material receptacle.

5. The method of claim 1 that further comprises purging gases from the void space by injecting a quantity of thermosetting material into the void space that is in excess of the volume of the void space and thereby forcing gases out of said void space.

6. The method of claim 1 wherein the ITA-based circuit resides in the cured form of the thermosetting material in a substantially horizontal orientation.

7. The method of claim 1 wherein the ITA-based circuit is positioned at least 0.01 mm above the bottom layer.

8. The method of claim 1 wherein the ITA-based circuit includes an antenna that is positioned at least 0.01 mm above the bottom layer.

9. The method of claim 1 wherein the inside surface of the top layer and the inside surface of the bottom layer are treated to facilitate the creation of a strong bond between the top layer and the thermosetting material and the bottom layer and the thermosetting material.

10. The method of claim 1 wherein the inside surface of the top layer and the inside surface of the bottom layer are treated by coating each with a bonding agent.

11. The method of claim 1 wherein the inside surface of the top layer and the inside surface of the bottom layer are treated by a corona discharge process.

12. The method of claim 1 wherein the thermosetting material is injected into the void space at a pressure between about ambient pressure and about 500 psi.

13. The method of claim 1 wherein the thermosetting material is injected into the void space at a pressure between about 80 and about 120 psi.

14. The method of claim 1 wherein the thermosetting material is injected into the void space at a temperature between about 56° F. and about 100° F.

15. The method of claim 1 wherein the thermosetting material is injected into the void space between the top layer and the bottom layer at a temperature between about 65° F. and about 70° F.

16. The method of claim 1 wherein a film bearing alphanumeric/graphic information is applied to the inside surface of the top layer.

17. The method of claim 1 wherein a layer of opacity enhancing material is applied to the inside surface of the top layer and the inside surface of the bottom layer.

18. The method of claim 1 wherein the ITA-based circuit includes an antenna that is electrically connected to a chip.

19. The method of claim 1 wherein the top layer and the bottom layer are each formed from a flat sheet of PVC material.

20. The method of claim 1 wherein the top layer is at least partially preformed with a card-forming cavity.

21. The method of claim 1 wherein the top layer is molded into a card-forming cavity of a top mold and the bottom layer is molded against a substantially flat surface of a bottom mold.

22. The method of claim 1 wherein the thermosetting material is a polyurethane.

23. The method of claim 1 wherein the thermosetting material is an epoxy.

24. The method of claim 1 wherein the thermosetting material is a unsaturated polyester.

25. The method of claim 1 wherein the void space is filled by a gate whose width is at least about 25 percent of the width of an edge of a precursor card being serviced by said gate.

* * * * *